United States Patent
Tian et al.

(10) Patent No.: US 10,229,533 B2
(45) Date of Patent: Mar. 12, 2019

(54) METHODS AND SYSTEMS FOR FAST RESAMPLING METHOD AND APPARATUS FOR POINT CLOUD DATA

(71) Applicant: Mitsubishi Electric Research Laboratories, Inc., Cambridge, MA (US)

(72) Inventors: Dong Tian, Boxborough, MA (US); Siheng Chen, Cambridge, MA (US); Chen Feng, Cambridge, MA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/358,346

(22) Filed: Nov. 22, 2016

(65) Prior Publication Data

US 2018/0122137 A1 May 3, 2018

Related U.S. Application Data

(60) Provisional application No. 62/417,007, filed on Nov. 3, 2016.

(51) Int. Cl.
*G06T 17/10* (2006.01)
*G06T 17/20* (2006.01)
(Continued)

(52) U.S. Cl.
CPC .............. *G06T 17/10* (2013.01); *G06F 17/10* (2013.01); *G06K 9/00214* (2013.01); *G06T 7/13* (2017.01);
(Continued)

(58) Field of Classification Search
CPC ......... G06T 17/00; G06T 17/10; G06T 17/20; G06T 15/00
See application file for complete search history.

(56) References Cited

U.S. PATENT DOCUMENTS

| 5,345,535 | A | * | 9/1994 | Doddington | ............ G10L 15/10 704/236 |
| 2003/0214502 | A1 | * | 11/2003 | Park | ...................... G06T 15/205 345/420 |

(Continued)

OTHER PUBLICATIONS

Cohen et al., "Attribute Compression for Sparse Point Clouds using Graph Transforms," 2016 IEEE International Conference on Image Processing (ICIP) Sep. 25, 2016. pp. 1374-1378.

(Continued)

*Primary Examiner* — Yi Yang
(74) *Attorney, Agent, or Firm* — Gene Vinokur; James McAleenan; Hironori Tsukamoto

(57) ABSTRACT

Systems and methods for determining a pattern in time series data representing an operation of a machine. A memory to store and provide a set of training data examples generated by a sensor of the machine, wherein each training data example represents an operation of the machine for a period of time ending with a failure of the machine. A processor configured to iteratively partition each training data example into a normal region and an abnormal region, determine a predictive pattern absent from the normal regions and present in each abnormal region only once, and determine a length of the abnormal region. Outputting the predictive pattern via an output interface in communication with the processor or storing the predictive pattern in memory, wherein the predictive pattern is a predictive estimate of an impending failure and assists in management of the machine.

18 Claims, 17 Drawing Sheets

(51) Int. Cl.
*G06T 7/521* (2017.01)
*G06T 7/13* (2017.01)
*G06F 17/10* (2006.01)
*G06K 9/00* (2006.01)
*G06T 15/08* (2011.01)
*G06T 17/00* (2006.01)

(52) U.S. Cl.
CPC .............. *G06T 7/521* (2017.01); *G06T 15/08* (2013.01); *G06T 17/00* (2013.01); *G06T 2207/10028* (2013.01)

(56) References Cited

U.S. PATENT DOCUMENTS

| | | | | |
|---|---|---|---|---|
| 2009/0276389 | A1* | 11/2009 | Constantine | G06N 7/005 706/52 |
| 2013/0144135 | A1* | 6/2013 | Mahfouz | G06T 19/20 600/309 |
| 2013/0243339 | A1* | 9/2013 | Fujiwara | G01C 11/00 382/206 |
| 2013/0321418 | A1* | 12/2013 | Kirk | G06T 15/04 345/423 |
| 2013/0335406 | A1* | 12/2013 | Tabellion | G06T 15/506 345/419 |

OTHER PUBLICATIONS

Siheng Chen et al., "Signal Representations on Graphs, Tools and Applications." ARXIV.org. Dec. 16, 2015. pp. 1-27, retrieved Apr. 3, 2018 form internet https://arxiv.org/pdf/1512.05406.pdf.

Siheng Chen, "Data Science with Graphs, A signal Processing Perspective." PhD thesis. Nov. 2016, pp. 1-274, Chapter 11. pp. 177-198. retrieved Apr. 3, 2018 from the internet http://repository.cmu.edu/cgi/viewcontent.cgi?article=1763&content=dissertations. Chapter 11.

Siheng Chen et al., "Fast Resampling of 3D Point Clouds via Graphs," Arxiv.org, Cornell University Library, 201 Olin Library Cornell University Ithaca NY 14853. Feb. 11, 2017.

Siheng Chen et al., "Contour enhanced resampling of 3D point clouds via graphs," 2017 IEEE International Conference on Acoustics, Speech and Signal Processing, IEEE, Mar. 5, 2017. pp. 2941-2945.

Yamamoto et al., "Deblurring of point cloud attributes in graph spectral domain," 2016 IEEE International Conference on Image Processing, IEEE, Sep. 25, 2016. pp. 1559-1563.

Cohen et al., "Point cloud attribute compression using 3D intra prediction and shape adaptive transforms," 2016 Data Compression Conference (DCC), Ieee. Mar. 30, 2016. pp. 141-150.

* cited by examiner

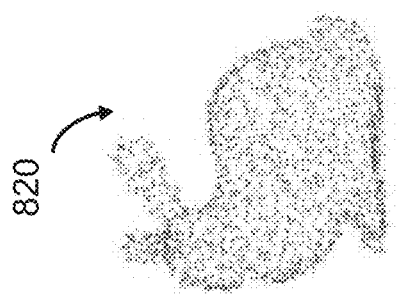
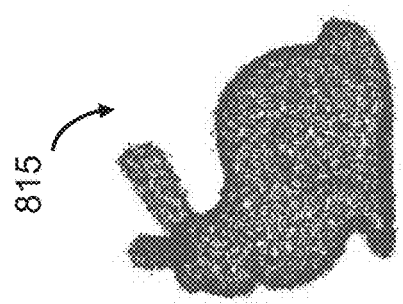
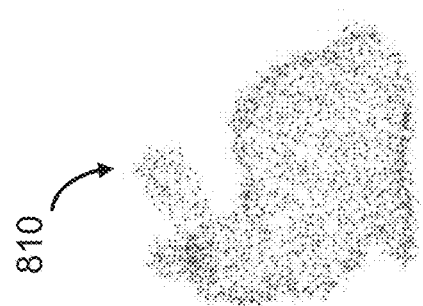
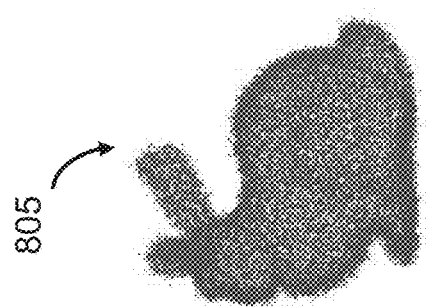
FIG. 8

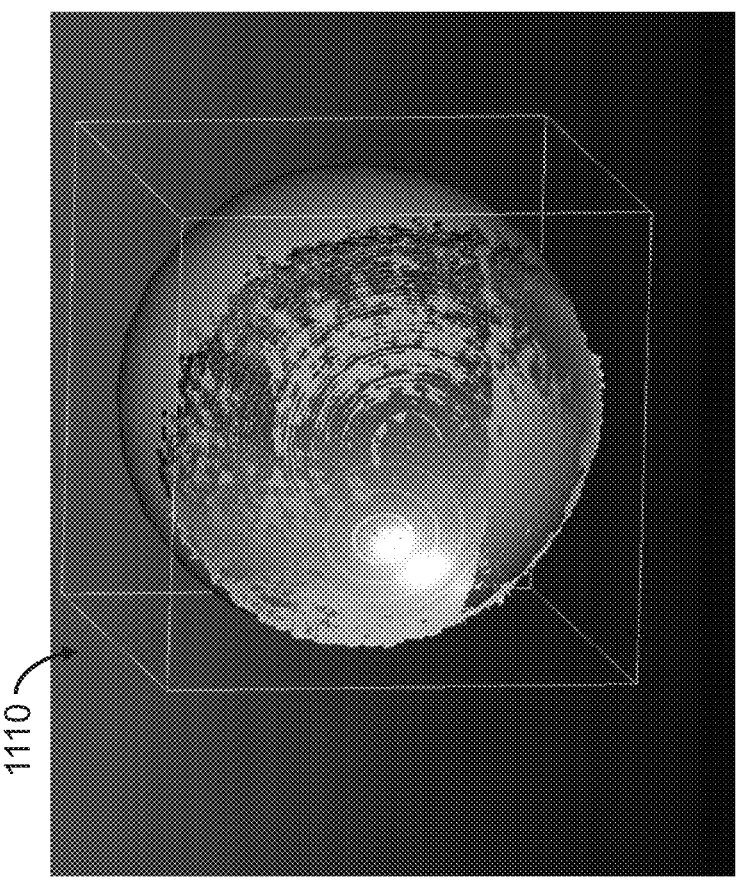
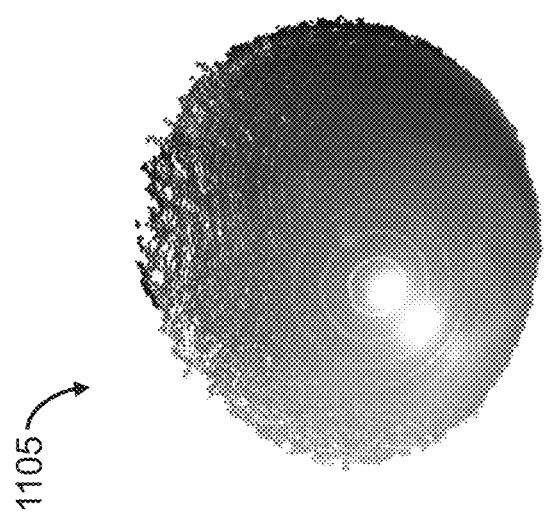
FIG. 11

|  | Original ball | Noisy ball | Uniform sampling | Denoised ball | Resampling based on low-pass graph filtering |
|---|---|---|---|---|---|
| Radius | 0.3182 | 0.3478 | 0.3520 | 0.3143 | 0.3199 |
| Center-x | 0.0833 | 0.0903 | 0.0975 | 0.0799 | 0.0849 |
| Center-y | 0.1903 | 0.2136 | 0.1794 | 0.1866 | 0.1783 |
| Center-z | 1.1725 | 1.3803 | 1.1530 | 1.1618 | 1.1613 |

FIG. 12

Algorithm $m$-hop

Input
- $X$   point cloud
- $A$   graph operator (matrix) or a function of graph operator (matrix)
- $m$   the number of hops
- $n$   the number of new sampling points
- $\mathcal{M}_{in}$   sampling set on points that have already been sampled

Output
$\mathcal{M}_{out}$ new sampling set on points to be sampled

Function
1. Let $Q = A$
2. Replace the rows in $Q$ with $1_i$ for sampled points $\forall i \in \mathcal{M}_{in}$, where entries of row vector $1_i$ are all 0, except that the $i$-th entry is equal to 1
3. Let $\xi_{\mathcal{M}} = \pi_{\mathcal{M}} = \| X - AX \|_{row}$, where $\| \cdot \|_{row}$ is a row-wise norm operator
4. Replace the entries in $\xi_{\mathcal{M}}$ with 0 for non-sampled points $\forall i \notin \mathcal{M}_{in}$
5. Loop $m$ times
   5.1 Update, $\xi_{\mathcal{M}} \leftarrow Q\xi_{\mathcal{M}}$
   end
6. Update, $\pi_{\mathcal{M}} \leftarrow \pi_{\mathcal{M}} - \xi_{\mathcal{M}}$
7. Select $n$ new sampling points according to $\pi_{\mathcal{M}}$ and generate new sampling set $\mathcal{M}_{out}$

Return $\mathcal{M}_{out}$

FIG. 15

Algorithm Weighted $K$-means++

Input $X$    point cloud
        $K$    number of reference points
Output $\mathcal{M}$    resampling set
Function
1. Initialize sampling set $\mathcal{M} = \emptyset$, sampling distribution $\pi_i = w_i / \sum_j w_j$ for all points $i$
2. Take one reference point from sampling distribution $\pi$
3. Loop until we have taken $K$ reference points
   3.1. Update sampling distribution $\{\pi_i\}$, where $\pi_i = w_i D^2(\mathbf{x}_i) / \sum_j w_j D^2(\mathbf{x}_j)$
       where $D(\mathbf{x}_i) = \min_{\mathcal{M}_j \in \mathcal{M}} \left\| \mathbf{x}_i - \mathbf{x}_{\mathcal{M}_j} \right\|_2$
   3.2. Take another reference point from sampling distribution $\pi$
end
return $\mathcal{M}$

FIG. 16

METHODS AND SYSTEMS FOR FAST RESAMPLING METHOD AND APPARATUS FOR POINT CLOUD DATA

FIELD

The present disclosure relates generally to simplifying of a point cloud, and in particular, simplifying the point cloud that is either organized or not or organized.

BACKGROUND

With the recent development of 3D sensing technologies, 3D point clouds have become a practical format to represent data points in many applications. A sensing device measures a large number of points on an object's surface, and the point cloud represents the set of points that has been measured. A point cloud typically includes a massive data set that defines a large number of data points in some coordinate system. For example, a laser scan of a physical object will typically produce a data set that contains millions of data points, each specified by a 3-tuple using orthogonal coordinates that represent 3D space (e.g. x, y, z).

The processing, analysis and reporting of such large point cloud data sets can be difficult. In particular, it is often the case that the size of a point cloud data set exceeds the design and performance capabilities of the systems that need to make use of this data. Consequently, methods for reducing the size of point cloud data sets are an important pre-processing step in order to reduce the volume of data to a level suitable for consuming systems. The simplified or reduced point cloud data can then be more efficiently processed.

There are a number of related art approaches for simplifying point cloud data. However, these related art approaches either carry a significant risk of losing data, such as key features of the objects and/or surfaces represented by the data (e.g. sub-sampling decimation, uniform spatial clustering) or are complicated to implement and therefore require more expense computationally, and require more processing time.

Therefore, a need exists in the art for an improved way to detect and/or predict machine failure from the large amounts of data.

SUMMARY

Embodiments of present disclosure are directed to simplifying the point cloud that is either organized or not or organized, by resampling the point cloud to preserve a subset of key points. This approach reduces the number of points without changing the locations of original points.

The embodiments of the present disclosure are based on a realization the point cloud does not need to be represented in a format suitable for all applications. Specifically, the point cloud can be represented in a format tailored for a specific application or for different applications, such that the point cloud can be reformatted into different formats/representations. By reformatting the point cloud into different formats/representations, the point cloud can be reformatted or pruned to preserve only points necessary for specific applications. At least one goal is to design application-dependent resampling strategies, preserving selected information depending on specific underlying applications. For example, in the task of contour detection in a point cloud, usually this requires careful and intensive computation, such as calculating surface normal and classifying points. Instead of working with an entire point cloud, there is more efficiently in a resample of a small subset of points that is sensitive to the required contour information, making the subsequent computation much cheaper without losing detection performance. Other examples may include a visualization and/or object modeling application, contours and some texture of the specific objects (but not others) can be preserved.

We realized it is more efficient to store multiple versions of point cloud pruned for specific purposes, than one version of point cloud suitable for all purposes. This can be true even when different pruned point clouds share the same points. For example, 100,000 points in an original point cloud can be turned into 60,000 points, or pruned into five different pruned point group of 5,000 points each. Thus, by pruning the point cloud for different applications to produce different pruned points, and executing a specific application with corresponding pruned points, the pruning can preserve a subset of the application specific to the key points. Other advantages can include reducing computational complexities and time, and reduces overall cost to run the specific application, when compared to trying to computationally run an application using the entire point cloud.

The present disclosure discloses techniques of selecting a subset of points that are rooted in graph signal processing, which is a framework to the interaction between signals and graph structure(s). We use a graph to capture the local dependencies between points, representing a discrete version of the surface of an object. At least one advantage of using a graph is to capture both local and global structures of point clouds. Under the present disclosure framework, the 3D coordinates and other attributes associated with each point are graph signals indexed by the nodes of the underlying graph. Thus, it becomes possible to formulate a resampling problem as sampling of graph signals. However, graph sampling techniques usually selects samples in a deterministic approach, which solve nonconvex optimization problems to obtain samples sequentially and require expensive computation. To leverage the computational cost, the present disclosure uses efficient randomized resampling strategies to choose a subset of key points from the input point cloud. The main idea is to generate subsamples according to a certain sampling distribution, which is both fast and noticeably useful to preserve information in the original input point cloud.

In other words, the present disclosure considers a feature-extraction based resampling framework, that is, the resampled points preserve selected information depending on the particular needs of a specific application. Then, based on a general feature-extraction operator, it is possible to quantify the quality of resampling by using a reconstruction error, and be able to derive the exact form. The optimal sampling distribution can be obtained by optimizing the expected reconstruction error. The present disclosure provides for an optimal sampling distribution that is guaranteed to be shift and rotation invariant. Which provides the feature extraction operator to be a graph filter and study the resampling strategies based on all-pass, low-pass and high-pass graph filtering. In each case, it is possible to derive the optimal sampling distribution and validate the performance on both simulated and real data.

Another way to explain this realization or to better understand how the pruning can be accomplished, the present disclosure uses each node on the graph by scoring each node according to the structure of the graph, based on the value of its neighboring nodes. A scoring function(s) can be selected based on the specific application, such that each different application can have their own scoring function or a multitude of scoring functions. For example, for contour determination, the scoring function can be an error in representation of the node as a function of neighboring nodes. Another example can be different scoring functions that can consider different attributes of the node. We realized that the scoring can determine probabilities of the nodes, which can be used with "random" resampling to handle the points with the same "scores" values.

In solving for resampling or processing the input point cloud, at least one system begins first by accessing the input point cloud. Wherein the input point cloud includes points, and each point includes a set of attributes including two dimensional (2D) and three dimensional (3D) coordinates and other attributes. The next step is to construct a graph (i.e. composing of graph vertex and graph edges), representing the input point cloud, based on each point in the input point cloud representing a node in the graph, and identify and connecting two neighboring nodes in the graph to obtain a graph edge.

Then, determine a graph filtering function based on the constructed graph, i.e. determine a graph operator as per a certain criteria to promote or maintain certain information in the input point cloud. Wherein, a set of attributes from the input point cloud can be also selected according to the specific application requirement, e.g. maintain geometric information and/or texture structure.

Followed by, filtering each point in the input point cloud by selecting a subset of attributes for the points, and applying by the graph filtering function on the selected subset of attributes, to determine at least one value for each point in the input point cloud. Using the at least one value for each point in the input point cloud, produce a probability for each point, based on the at least one value of the point compared to a total of all values of the points in the input point cloud, and a predetermined number of points in an output point cloud. In other words, an importance score can be calculated for each point in the point cloud using the selected graph operator. Such that based on the importance scores, a probability is generated for each point.

Finally, sample the input point cloud using random evaluation of the probabilities of each point, to obtain a subset of points in the input point cloud, wherein the subset of points is the output point cloud. Which means that a subset of points is determined based on the probability and an expected total number of points can be outputted for further usage. For example, the output point cloud can be stored in memory or outputted via an output interface in communication with the processor. It is noted that the input point cloud when compared to the selected output point cloud, i.e. the selected subset of key points from the system, can be more efficiently processed later.

For example, in one embodiment for large-scale visualization, it may be easier for a viewer to catch important details in a point cloud of a city environment when using a high-pass graph filtering based resampling. It is possible that for one embodiment for large-scale visualization, we can use the proposed high-pass graph filtering based resampling strategy to select a small subset of points to highlight the contours of buildings and streets in a urban scene.

In another example, the present disclosure may have another embodiment for robust shape modeling, such that it may be more efficient and accurate to identify the object model parameters when using a proposed low-pass graph filtering based resampling strategy to select a small subset of points. Wherein such modeling may involve finding the surfaces in a point cloud with noises or outliers being present and the present disclosure can be used to solve the problem(s).

According to an embodiment of the present disclosure, a system for processing input point cloud having points, wherein each point includes a set of attributes including two dimensional (2D) and three dimensional (3D) coordinates and other attributes. The system including sensors sensing a scene, and in communication with a computer readable memory to produce the input point cloud. The system includes an output interface. A processor in communication with the computer readable memory, wherein the processor is configured to access the input point cloud, and construct a graph representing the input point cloud, based on each point in the input point cloud representing a node in the graph, and identify and connecting two neighboring nodes in the graph to obtain a graph edge. Determine a graph filtering function based on the constructed graph. Filter each point in the input point cloud by selecting a subset of attributes for the points and applying by the graph filtering function on the selected subset of attributes, to determine at least one value for each point in the input point cloud. Produce a probability for each point, based on the at least one value of the point compared to a total of all values of the points in the input point cloud, and a predetermined number of points in an output point cloud. Sample the input point cloud using random evaluation of the probabilities of each point, to obtain a subset of points in the input point cloud, wherein the subset of points is the output point cloud. Finally, store the output point cloud in the computer readable memory or output the output point cloud via the output interface in communication with the processor, wherein the output point cloud is used to assist in subsequent processing and assists in management of the input cloud data.

According to another embodiment of the present disclosure, a method for processing input point cloud having points, wherein each point includes a set of attributes including two dimensional (2D) and three dimensional (3D) coordinates and other attributes. The method including sensing a scene via sensors, the sensors are in communication with a computer readable memory to produce the input point cloud. Using a processor in communication with the computer readable memory, wherein the processor is configured for accessing the input point cloud, and constructing a graph representing the input point cloud, based on each point in the input point cloud representing a node in the graph, and identify and connecting two neighboring nodes in the graph to obtain a graph edge. Determining a graph filtering function based on the constructed graph. Filtering each point in the input point cloud by selecting a subset of attributes for the points and applying by the graph filtering function on the selected subset of attributes, to determine at least one value for each point in the input point cloud. Producing a probability for each point, based on the at least one value of the point compared to a total of all values of the points in the input point cloud, and a predetermined number of points in an output point cloud. Sampling the input point cloud using random evaluation of the probabilities of each point, to obtain a subset of points in the input point cloud, wherein the subset of points is the output point cloud. Finally, storing the output point cloud in the computer readable memory or outputting the output point cloud via the output interface in communication with the processor, wherein the output point cloud is used to assist in subsequent processing and assists in management of the input cloud data.

According to another embodiment of the present disclosure, a non-transitory computer readable storage medium embodied thereon a program executable by a computer for performing a method. The method for processing stored input point cloud having points, wherein each point includes a set of attributes including two dimensional (2D) and three dimensional (3D) coordinates and other attributes. The method including sensing a scene via sensors, the sensors are in communication with the non-transitory computer readable storage medium to produce the input point cloud. Constructing a graph representing the input point cloud, based on each point in the input point cloud representing a node in the graph, and identify and connecting two neighboring nodes in the graph to obtain a graph edge. Determining a graph filtering function based on the constructed graph. Filtering each point in the input point cloud by selecting a subset of attributes for the points and applying by the graph filtering function on the selected subset of attributes, to determine at least one value for each point in the input point cloud. Producing a probability for each point, based on the at least one value of the point compared to a total of all values of the points in the input point cloud, and a predetermined number of points in an output point cloud. Sampling the input point cloud using random evaluation of the probabilities of each point, to obtain a subset of points in the input point cloud, wherein the subset of points is the output point cloud. Finally, storing the output point cloud in the non-transitory computer readable storage medium or outputting the output point cloud via an output interface in communication with the computer, wherein the output point cloud is used to assist in subsequent processing and assists in management of the input cloud data.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 8 is a schematic illustrating the denoising performance by using a proposed resampling method on an example point cloud, according to embodiments of the present disclosure;

FIG. 11 is a schematic illustrating the results of a prior art object fitting approach on a point cloud for fitness ball, according to embodiments of the present disclosure;

FIG. 12 is a table that compares the object fitting results when using a proposed low-pass filter based resampling, according to embodiments of the present disclosure;

FIG. 15 is a table that shows a flowchart of a proposed conditional resampling, according to embodiments of the present disclosure;

FIG. 16 is a table that shows a flowchart of a proposed reference-based resampling, according to embodiments of the present disclosure.

Figure 1:
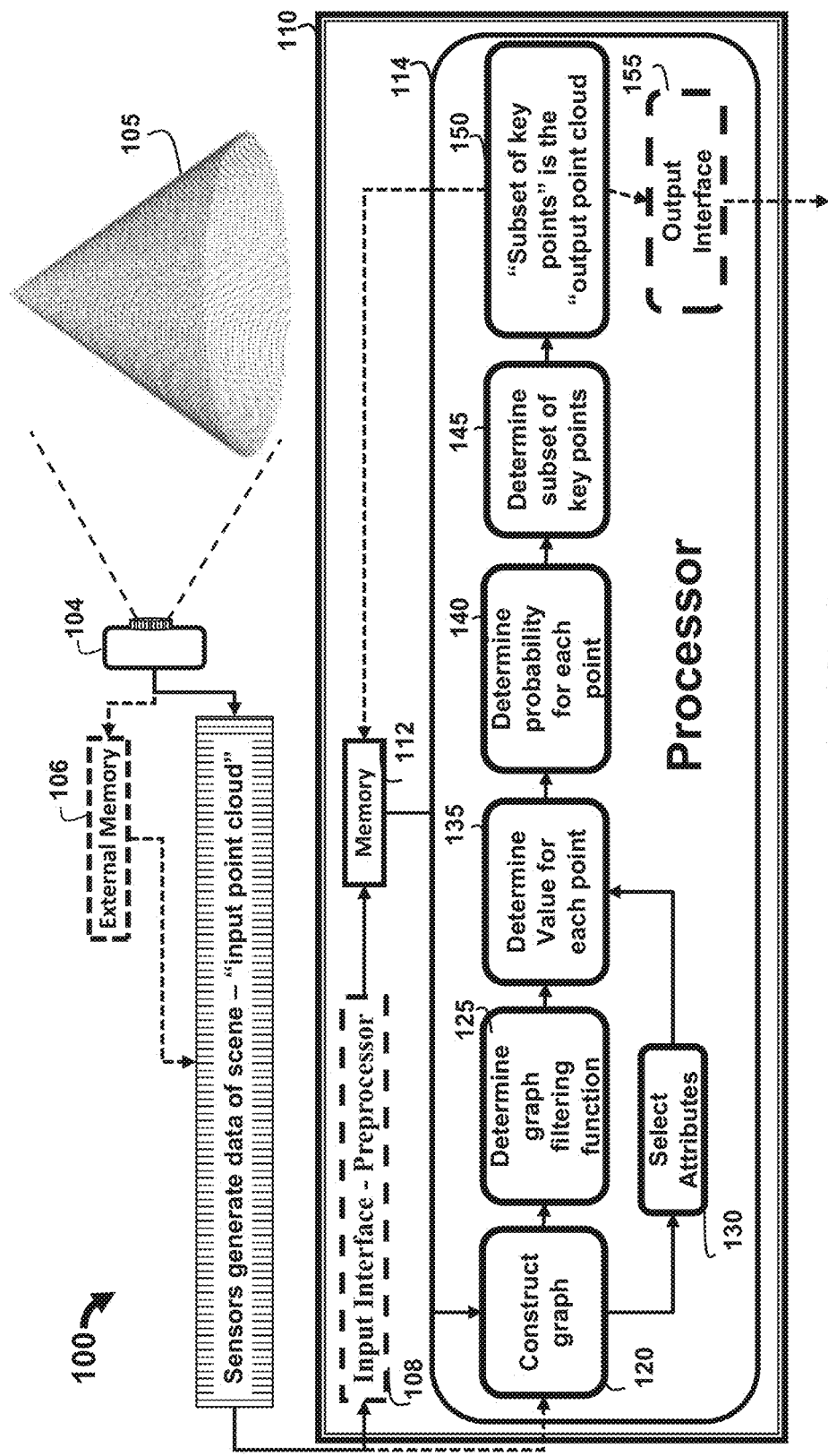
FIG. 1 is a block diagram illustrating a system for resampling or processing an input point cloud having points, according to an embodiment of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview of Embodiments of the Present Disclosure

Figure 2:
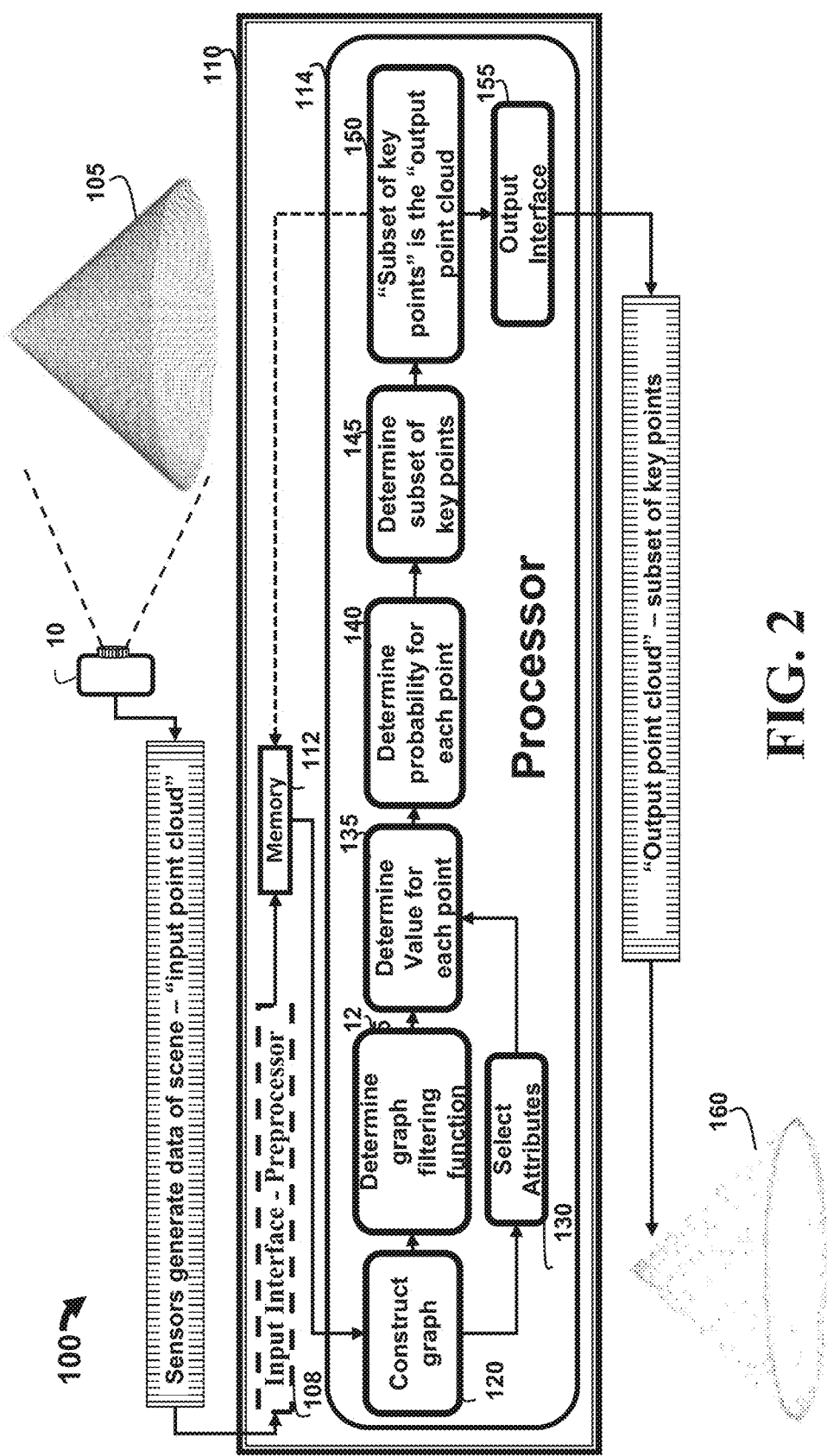
FIG. 2 is a block diagram illustrating the system of FIG. 1A for resampling or processing the input point cloud and resampling to produce an output point cloud, according to an embodiment of the present disclosure.

FIG. 1 and FIG. 2 are block diagrams illustrating system 100 for resampling or processing input point cloud having points, according to an embodiment of the present disclosure. The system 100 includes a sensor 104 that generates the input point cloud data of a scene 105, object or some other data generated from the sensor 104. The sensor 104 can be a camera or video camera or some other device that generates input point cloud data. A computer readable memory 112 can store and/or provide the input point cloud data generated by the sensor 104. The sensor(s) 104 collect the input point cloud data of the scene 105 which can be optionally stored in an external memory 106 or sent directly to an input interface/preprocessor 108, and then sent to the processor 114. Upon being processed the data can either be stored in memory 112 or outputted via the output interface 116. During processing, the processor 114 may communication with the memory 112 for storing or retrieving stored instructions or other data related to processing the input point cloud data. Computer 110 includes a processor 114, computer readable memory 112, input interface 108 and output interface 155.

The embodiments of the present disclosure are based on a realization the point cloud does not need to be represented in a format suitable for all applications when considering processing the input point cloud. In fact, the point cloud can be represented in a format tailored for a specific application or for different applications, and is reformatted into different formats/representations. Reformatting or resampling the input point cloud is done to preserve only points necessary for a specific application or for multiple applications. The preserved points from the input point cloud is selected information specific to the needs of the particular application. For example, for visualization and object modeling applications, contours and some texture of some specific objects are preserved, among other things. Specifically, we realized it is more efficient to store multiple versions of point cloud reformatted or resampled for specific purposes, than one version of point cloud suitable for all purposes. By resampling the point cloud for different applications we essentially produce different groups of resampled points or subgroups of the overall input point cloud, that are then executed for the specific application with the corresponding resampled points. Because of this realization, we observed reduced computational complexities and time, and reduced overall cost to run the specific application, when compared to trying to computationally run an application using the entire input point cloud.

The selecting a subset of points is rooted in graph signal processing, which is a framework to learn about the interaction between signals and graph structure(s). We found that using a graph to capture the local dependencies between points, and representing a discrete version of the surface of an object, the present disclosure is able to deliver both local and global structures of point clouds. Under this framework, the 3D coordinates and other attributes associated with each point are graph signals indexed by nodes of the underlying graph. Which we discovered makes it possible to formulate a resampling problem as sampling of graph signals. This feature-extraction based resampling framework, i.e. resampled points preserving selected information per specific application, is based on a general feature-extraction operator, which we quantified the quality of resampling using a reconstruction error to derive the exact form. The optimal sampling distribution is obtained by optimizing the expected reconstruction error. The proposed optimal sampling distribution is guaranteed to be shift and rotation invariant. Wherein we present the feature extraction operator as a graph filter and analyze the resampling strategies based on all-pass, low-pass and high-pass graph filtering. In each case, we obtain the optimal sampling distribution and validate the performance on both simulated and real data.

The realization of resampling or pruning of the input point cloud can be generally explained by using each node on the graph and scoring each node according to a structure of the graph, based on a value of its neighboring nodes. We realized that the scoring can determine probabilities of the nodes, which can be used with "random" resampling to handle the points with the same "scores" values. For example, for contour determination, the scoring function can be an error in representation of the node as a function of neighboring nodes, or another example can be different scoring functions that can consider different attributes of the node. A scoring function(s) is selected based on the specific application, where each different application may have their own scoring function or a multitude of scoring functions.

Referring to FIG. 1 and FIG. 2, to solve for resampling the input point cloud, begins first by accessing the input point cloud either from memory 112 or directly from the sensor 104. Remember, the input point cloud includes points, and each point includes a set of attributes including two dimensional (2D) and three dimensional (3D) coordinates and other attributes. The next step is to construct a graph 120, i.e. composing of graph vertex and graph edges, representing the input point cloud, based on each point in the input point cloud representing a node in the graph, and identify and connecting two neighboring nodes in the graph to obtain a graph edge.

Then, determine a graph filtering function 125 based on the constructed graph 120, i.e. determine a graph operator as per a certain criteria to promote or maintain certain information in the input point cloud. Wherein, a set of attributes 130 from the input point cloud can be also selected according to the specific application requirement, e.g. maintain geometric information and/or texture structure.

Followed by, determining a value for each point 135, wherein filtering each point in the input point cloud is by selecting a subset of attributes 130 for the points, and applying the graph filtering function on the selected subset of attributes 135, to determine at least one value for each point 135 in the input point cloud. Using, the at least one value for each point 135 in the input point cloud to produce a probability for each point 140, based on the at least one value of the point 135 compared to a total of all values of the points in the input point cloud, and a predetermined number of points in an output point cloud. In other words, an importance score can be calculated for each point in the point cloud using the selected graph operator. Such that, based on the importance scores, a probability is generated for each point.

Finally, still referring to FIG. 1 and FIG. 2, sample the input point cloud using random evaluation of the probabilities of each point, to obtain a subset of points 145 in the input point cloud, wherein the subset of points 145 is the output point cloud 150. Which means that a subset of points 145 is determined based on the probability and an expected total number of points that can be outputted for further usage. For example, the output point cloud 150 can be stored in memory 112 or outputted via an output interface 155 in communication with the processor. It is noted that the input point cloud when compared to the selected output point cloud 150, i.e. the selected subset of key points 145 from the system, can be more efficiently processed later.

Referring to FIG. 2, as an example, in one embodiment for large-scale visualization, it can be easier for a viewer to catch important details in a point cloud of an preprossed object 105 or a city environment when using a high pass graph filtering based resampling. Also, for the one embodiment for the large-scale visualization, it is possible to use the proposed high pass graph filtering based resampling strategy to select a small subset of points to highlight the contours of the processed object 160 or buildings and streets in the city or in an urban scene.

Further, another embodiment of the present disclose can be for robust shape modeling. Wherein, it may be more efficient and accurate to identify the object model parameters when using a proposed low-pass graph filtering based resampling strategy to select a small subset of points. Wherein such modeling may involve finding the surfaces in a point cloud with noises or outliers being present and the present disclosure can be used to solve the problem(s).

Formulation of the Task of Resampling Input Point Cloud

To better understand formulating the task of resampling a 3D point cloud, we need to introduce graph signal processing, which outlays a foundation for the methods and systems for the embodiments of the present disclosure.

Resampling A Point Cloud

We consider a matrix representation of a point cloud with N points and K attributes, $$X = [s_1\ s_2\ \ldots\ s_K] = \begin{bmatrix} x_1^T \\ x_2^T \\ \vdots \\ x_N^T \end{bmatrix} \in R^{N \times K}, \quad (1)$$

where $s_i \in R^N$ represents the ith attribute and $x_i \in R^K$ represents the ith point. Depending on a sensing device, attributes can be 3D coordinates, RGB colors, textures, and many others. To distinguish 3D coordinates and other attributes, we use $X_c \in R^{N \times 3}$ to represent 3D coordinates and $X_o \in R^{N \times (K-3)}$ to represent other attributes.

The number of points N is usually huge. For example, a 3D scanning of a building usually needs billions of 3D points. It is challenging to work with a large-scale point cloud from both storage and data analysis perspectives. In many applications, however, we are interested in a subset of 3D points with particular properties, such as key points in point cloud registration and contour points in contour detection. To leverage the storage and computation, we consider sampling a subset of representative points from the original point cloud to reduce the scale. Since the original point cloud is sampled from an object, we call this task resampling. The procedure of resampling is to resample M (M<N) points from a point cloud, or select M rows from the point cloud matrix X. The resampled point cloud is $$X_M = \Psi X \in R^{M \times K}, \quad (2)$$

where $M = (M_1, \ldots, M_M)$ denotes the sequence of resampled indices, or called resampling set, and $M_i \in \{1, \ldots, N\}$ and $|M| = M$, and the resampling operator $\Psi$ is a linear mapping from $R^N$ to $R^M$, defined as $$\Psi_{i,j} = \begin{cases} 1, & j = M_i; \\ 0, & \text{otherwise} \end{cases}. \quad (3)$$

The efficiency of the proposed resampling strategy is critical. Since we work with a large-scale point cloud, we want to avoid expensive computation. To implement resampling in an efficient way, we consider a randomized resampling strategy. It means that the resampled indices are chosen according to a sampling distribution. Let $\{\pi_i\}_{i=1}^N$ be a series of sampling probabilities, where $\pi_i$ denotes the probability to select the ith sample in each random trial. Once the sampling distribution is chosen, it is efficient to generate samples. The goal here is to find a sampling distribution that preserves information in the original point cloud.

The invariant property of the proposed resampling strategy is also critical. When we shift or rotate a point cloud, the intrinsic distribution of 3D points does not changed and the proposed resampling strategy should not change.

Definition 1 A resampling strategy is shift-invariant when a sampling distribution $\pi$ is designed for a point cloud, $X = [X_c\ X_o]$, then the same sampling distribution $\pi$ is designed for its shifted point cloud, $[X_c + 1a^T\ X_o]$, where $a \in R^3$.

Definition 2 A resampling strategy is rotation-invariant when a sampling distribution $\pi$ is designed for a point cloud, $X = [X_c\ X_o]$, then the same sampling distribution $\pi$ is designed for its rotated point cloud, $[X_c R\ X_o]$, where $R \in R^{3 \times 3}$ is a 3D rotation matrix.

We should guarantee that the proposed resampling strategy is both shift and rotation invariant.

Graph Signal Processing for Point Clouds

A graph is a natural and efficient way to represent a point cloud because it is a discrete representation of the surface of an object. In computer graphics, polygon meshes, as a class of graphs with particular connectivity restrictions, are extensively used to represent the shape of an object. To construct a reliable mesh, we usually need sophisticated geometry analysis, such as calculating surface normals. The mesh representation is a simple tool for visualization, but may not be good at analyzing point clouds. Here we extend polygon meshes to general graphs by relaxing the connectivity restrictions. Such graphs are efficient to construct and are flexible to capture geometry information.

Graph Construction

We construct a general graph of a point cloud by encoding the local geometry information in an adjacency matrix $W \in R^{N \times N}$. Let $x_i^{(c)} \in R^3$ be the 3D coordinates of the ith point; that is, the ith row of $X_c$. The edge weight between two points $x_i^{(c)}$ and $x_j^{(c)}$ is $$W_{i,j} = \begin{cases} e^{-\frac{\|x_i^{(c)} - x_j^{(c)}\|_2^2}{\sigma^2}}, & \|x_i^{(c)} - x_j^{(c)}\|_2 \leq \tau; \\ 0, & \text{otherwise} \end{cases} \quad (4)$$

where variance $\sigma$ and threshold $\tau$ are hyperparameters. Equation (4) shows that when the Euclidean distance of two points is smaller than a threshold $\tau$, we connect these two points by an edge and the edge weight depends on the similarity of two points in the 3D space. We call this type of graph as $\tau$-Graph in this invention. The weighted degree matrix D is a diagonal matrix with diagonal element $D_{i,i} = \Sigma_j W_{i,j}$ reflecting the density around the ith point. This graph is approximately a discrete representation of the original surface and can be efficiently constructed via a tree data structure, such as octree. Here we only use the 3D coordinates to construct a graph, but it is also feasible to take other attributes into account (4). Given this graph, the attributes of point clouds are called graph signals. For example, an attribute s in (1) is a signal index by the graph. Without explicitly statement, we assume a $\tau$-Graph is in use.

In another example of graph construction, a point is connected to its a certain number of nearest neighbors.

Graph Filtering

A graph filter is a system that takes a graph signal as an input and produces another graph signal as an output. Let $A \in R^{N \times N}$ be a graph shift operator, which is the most elementary nontrivial graph filter. Some common choice of a graph shift operator is the adjacency matrix W (4), the transition matrix $T = D^{-1}W$, the graph Laplacian matrix $L = D - W$, and many other structure-related matrices. The graph shift replaces the signal value at a node with a weighted linear combination of values at its neighbors; that is, $$y = As \in R^N,$$

where $s \in R^N$ is an input graph signal (an attribute of a point cloud). Every linear, shift-invariant graph filter is a polynomial in the graph shift $$h(A) = \sum_{l=0}^{L-1} h_l A^l = h_0 I + h_1 A + \ldots + h_{L-1} A^{L-1}, \quad (5)$$

where $h_i$ are filter coefficients and L is the length of this graph filter. Its output is given by the matrix-vector product $$y = h(A)s \in R^N.$$

Graph Fourier Transform

The eigen decomposition of a graph shift operator A is $$A = V \Lambda V^T, \quad (6)$$

where the eigenvectors of A form the columns of matrix V, and the eigenvalue matrix $\Lambda \in R^{N \times N}$ is the diagonal matrix of corresponding eigenvalues $\lambda_1, \ldots, \lambda_N$ of A ($\lambda_1 \geq \lambda_2 \geq \ldots, \geq \lambda_N$). These eigenvalues represent frequencies on the graph [?] where $\lambda_1$ is the lowest frequency and $\lambda_N$ is the highest frequency. Correspondingly, $v_1$ captures the smallest variation on the graph and $v_N$ captures the highest variation on the graph. V is also called graph Fourier basis. The graph Fourier transform of a graph signal $s \in R^N$ is $$\hat{s} = V^T s. \quad (7)$$

The inverse graph Fourier transform is $$s = V\hat{s} = \sum_{k=1}^{N} \hat{s}_k v_k,$$

where $v_k$ is the kth column of V and $\hat{s}_k$ is the kth component in $\hat{s}$. The vector $\hat{s}$ in (7) represents the signal's expansion in the eigenvector basis and describes the frequency components of the graph signal s. The inverse graph Fourier transform reconstructs the graph signal by combining graph frequency components.

Resampling Based on Feature Extraction

During resampling, we reduce the number of points and unavoidably lose information in a point cloud. Our goal here is to design an application-dependent resampling strategy, preserving selected information depending on particular needs. For example, in the task of contour detection in a point cloud, we usually need careful and intensive computation, such as calculating surface normals and classifying points [?, ?]. Instead of working with a large number of points, we consider efficiently resampling a small subset of points that is sensitive to the required contour information, making the subsequent computation much cheaper without losing contour information.

Feature-Extraction Based Formulation

Let $f(\bullet)$ be a feature-extraction operator that extracts targeted information from a point cloud according to particular needs; that is, the features $f(X) \in R^{N \times K}$ are extracted from a point cloud $X \in R^{N \times K}$. We resample a point cloud M times. In the jth time, we independently choose a point $M_j = i$ with probability $\pi_i$. Let $\Psi \in R^{M \times N}$ be the resampling operator (3) and $S \in R^{N \times N}$ be a diagonal rescaling matrix with $S_{i,i} = 1/\sqrt{M\pi_i}$. We quantify the performance of a resampling operator as follows:

$$D_{f(X)}(\Psi) = \|S\Psi^T \Psi f(X) - f(X)\|_2^2, \quad (8)$$

where $\|\bullet\|_2$ is the spectral norm. $\Psi^T \Psi \in R^{N \times N}$ is a zero-padding operator, which a diagonal matrix with diagonal elements $(\Psi^T \Psi)_{i,i} = 1$ when the ith point is sampled, and 0, otherwise. The zero-padding operator $\Psi^T \Psi$ ensures the resampled points and the original point cloud have the same size. S is used to compensate non-uniform weights during resampling. $S\Psi^T \Psi f(X)$ represents the preserved features after resampling in a zero-padding form. From another aspect, $S\Psi^T$ is the most naive interpolation operator that reconstructs the original feature f(X) from its resampled version Ψf(X). The evaluation metric $D_{f(X)}(\Psi)$ measures the reconstruction error; that is, how much feature information are lost after resampling without using sophisticated interpolation operator. When $D_{f(X)}(\Psi)$ is small, preserved features after resampling are close to the original features, meaning that few information is lost. The expectation $E_{\Psi:\pi}(D_{f(X)}(\Psi))$ provides the expected error caused by resampling and quantifies the performance of a sampling distribution π. Our goal is to minimize $E_{\Psi:\pi}(D_{f(X)}(\Psi))$ over π to obtain an optimal sampling distribution in terms of preserving features f(X). We now derive the exact form of mean square error of the objective function.

Lemma 1 The nonweighted version of preserved feature is a biased estimator to the original feature, $$E_{\Psi:\pi}(\Psi^T\Psi f(X)) \propto \pi \bullet f(X), \text{ for all } f(X) \in R^{N \times K}.$$

where • is the row-wise multiplication.
The reweighted version of preserved feature is an unbiased estimator to the original feature, that is, $$E_{\Psi:\pi}(S\Psi^T\Psi f(X)) = f(X), \text{ for all } f(X) \in R^{N \times K}.$$

Theorem 1 The exact form of mean square error between the preserved feature and the original feature is, $$E_{\Psi:\pi}(D_{f(X)}(\Psi)) = Tr(f(X)Qf(X)^T), \quad (9)$$

where $Q \in R^{N \times N}$ is a diagonal matrix with $Q_{i,i} = 1/\pi_i - 1$.

The sufficient condition of the shift and rotation-invariant of a proposed resampling strategy is that the evaluation metric (8) is shift and rotation-invariant.

Definition 3 A feature-extraction operator f(•) is shift-invariant when the features extracted from a point cloud and its shifted version are same; that is, $f([X_c \ X_o]) = f([X_c + 1a^T \ X_o])$, where shift $a \in R^3$.

Definition 4 A feature-extraction operator f(•) is rotation-invariant when the features extracted from a point cloud and its rotated version are same; that is, $f([X_c \ X_o]) = f([X_cR \ X_o])$, where $R \in R^{3 \times 3}$ is a 3D rotation matrix.

When f(•) is shift/rotation-invariant, (8) does not change through shifting or rotating, leading to a shift/rotation-invariant resampling strategy and it is sufficient to minimize $E_{\Psi:\pi}D_{f(X)}(\Psi))$ to obtain a resampling strategy; however, when f(•) is shift/rotation-variant, (8) may change through shifting or rotating, leading to a shift/rotation-variant resampling strategy.

To handle shift variance, we can always recenter a point cloud to the origin before any process; that is, we normalize the mean coordinates of 3D points to zeros. To handle rotation variance of f(•), we consider the following evaluation metric:

$$D_f(\Psi) = \max_{X'_c: \|X'_c\|_2 = c} D_{f([X'_c \ X_o])}(\Psi)$$
$$= \max_{X'_c: \|X'_c\|_2 = c} \|(\Psi^T\Psi S\Psi^T\Psi - I)f([X'_c \ X_o])\|_F^2,$$

where $\|\bullet\|_2$ is the spectral norm and constant $c = \|X_c\|_2$ is the spectral norm of the original 3D coordinates. The evaluation metric $D_f(\Psi)$ considers the worst possible reconstruction error caused by rotation to remove the influence of rotation. In (??), we consider 3D coordinates are variables due to rotation. We constraint the spectral norm of 3D coordinates because a rotation matrix is orthonormal and the spectral norm of 3D coordinates does not change during rotation. We then minimize $E_{\Psi:\pi}(D_f(\Psi))$ to obtain an invariant resampling strategy even when f(•) is variant.

Theorem 2 Let f(•) be a rotation-variant linear feature-extraction operator, where f(X)=FX with $F \in R^{N \times N}$. The exact form of $E_{\Psi:\pi}D_f(\Psi)$ is, $$E_{\Psi:\pi}(D_f(\Psi)) = c^2 Tr(FQF^T) + Tr(FX_oQ(FX_o)^T), \quad (10)$$

where $c = \|X_c\|_2$ and $Q \in R^{N \times N}$ is a diagonal matrix with $Q_{i,i} = 1/\pi_i - 1$.

Optimal Sampling Distribution

We now derive the optimal sampling distributions by minimizing the expected reconstruction error.

For a shift and rotation-invariant feature-extraction operator, we minimize (8).

Theorem 3 Let f(•) be a shift and rotation-invariant feature-extraction operator. The corresponding optimal resampling strategy π* is, $$\pi^*_i \propto \|f_i(X)\|_2, \quad (11)$$

where $f_i(X) \in R^K$ is the ith row of f(X).

For a shift and rotation-variant feature-extraction operator, we minimize.

Theorem 4 Let f(•) be a shift and rotation-variant linear feature-extraction operator, where f(X)=FX with $F \in R^{N \times N}$. The corresponding optimal resampling strategy π* is, $$\pi^*_i \propto \sqrt{c^2\|F_i\|_2^2 + \|(FX_o)_i\|_2^2}, \quad (12)$$

where constant $c = \|X_c\|_2$, $F_i$ is the ith row of F and $(FX_o)_i$ is the ith row of $FX_o$.

Resampling Based on Graph Filtering

In this section, we design graph filters to exact features from a point cloud. Let features extracted from a point cloud X be $$f(X) = h(A)X = \sum_{l=0}^{L-1} h_l A^l X,$$

which follows from the definition of graph filters (5). Similarly to filter design in classical signal processing, we design a graph filter either in the graph vertex domain or in the graph spectral domain.

In the graph vertex domain, for each point, a graph filter averages the attributes of its local points. For example, the output of the ith point, $f_i(X) = \sum_{l=0}^{L-1} h_l(A^lX)_i$ is a weighted average of the attributes of points that are within L hops away from the ith point. The lth graph filter coefficient, $h_l$, quantifies the contribution from the lth-hop neighbors.

We design the filter coefficients to change the weights in local averaging.

In the graph spectral domain, we first design a graph spectrum distribution and then use
graph filter coefficients to fit this distribution. For example, a graph filter with length L is $$h(A) = Vh(\Lambda)V^T = V \begin{bmatrix} \sum_{l=0}^{L-1} h_l \lambda_1^l & 0 & \cdots & 0 \\ 0 & \sum_{l=0}^{L-1} h_l \lambda_2^l & \cdots & 0 \\ \vdots & \vdots & \ddots & \vdots \\ 0 & 0 & \cdots & \sum_{l=0}^{L-1} h_l \lambda_N^l \end{bmatrix} V^T,$$

where V is the graph Fourier basis and $\lambda_i$ are graph frequencies (6). When we want the
response of the ith graph frequency is $c_i$, we set $$h(\lambda_i) = \sum_{l=0}^{L-1} h_l \lambda_i^l = c_i,$$

and solve a set of linear equations to obtain the graph filter coefficients $h_l$. It is also possible to
use the Chebyshev polynomial to design graph filter coefficients [?]. We now consider some
special cases of graph filters.

All-Pass Graph Filtering

Let $h(\lambda_i)=1$; that is, $h(A)$ is an identity matrix with $h_0=1$ and $h_i=0$ for
i=1, . . . , L−1. The intuition behind this setting is that the original point cloud is trustworthy and all points are uniformly sampled from an object without noise, reflecting the true geometric structure of the object. We want to preserve all the information and the features are thus the original attributes themselves. Since $f(X)=X$, the feature-extraction operator $f(\cdot)$ is shift and rotation-variant. Based on Theorem 4, the optimal resampling strategy is $$\pi^*_i \propto \sqrt{c^2 + \|(X_o)_i\|_2^2}. \tag{13}$$

Here the feature-extraction matrix F in (12) is an identity matrix and the norm of each
row of F is 1. When we only preserve 3D coordinates, we ignore the term of $X_o$ and obtain a constant sampling probability for each point, meaning that uniform sampling is the optimal resampling strategy to preserve the overall geometry information.

High-Pass Graph Filtering

In image processing, a high-pass filter is used to extract edges and contours. Similarly, we
use a high-pass graph filter to extract contours in a point cloud. Here we only consider the 3D coordinates as attributes ($X=X_c \in R^{N \times 3}$), but the proposed method can be easily extended to other attributes.

A critical question is how to define contours in a point cloud. We consider that contour
points break the trend formed by its neighboring points and bring innovation. Many previous works need sophisticated geometry-related computation, such as surface normal, to detect contours [?]. Instead of measuring sophisticated geometry properties, we describe the possibility of being a contour point by the local variation on graphs, which is the response of high-pass graph filtering. The corresponding local variation of the ith point is $$f_i(X) = \|(h(A)X)_i\|_2^2, \tag{14}$$

where $h(A)$ is a high-pass graph filter. The local variation $f(X) \in R^N$ quantifies the energy of
response after high-pass graph filtering. The intuition behind this is that when the local variation of a point is high, its 3D coordinates cannot be well approximated from the 3D coordinates of its neighboring points; in other words, this point bring innovation by breaking the trend formed by its neighboring points and has a high possibility to be a contour point.

The following theorem shows the local variation is rotation invariant, but shift variant.

Theorem 5 Let $f(X)=\text{diag}(h(A)XX^T h(A)^T) \in R^N$, where $\text{diag}(\cdot)$ extracts the diagonal
elements. $f(X)$ is rotation invariant and shift invariant unless $h(A)1=0 \in R^N$.

To guarantee the local variation is both shift and rotation invariant, we use a transition
matrix as a graph shift operator; that is, $A=D^{-1}W$, where D is the diagonal degree matrix. The reason is that $1 \in R^N$ is the eigenvector of a transition matrix, $A1=D^{-1}W1=1$. Thus, $$h(A)1 = \sum_{l=0}^{N-1} h_l \lambda^l 1 = \sum_{l=0}^{N-1} h_l 1 = 0,$$

when $\Sigma_{l=0}^{N-1} h_l=0$. A simple design is a Haar-like high-pass graph filter $$h_{HH}(A) = I - A = V \begin{bmatrix} 1-\lambda_1 & 0 & \cdots & 0 \\ 0 & 1-\lambda_2 & \cdots & 0 \\ \vdots & \vdots & \ddots & \vdots \\ 0 & 0 & \cdots & 1-\lambda_N \end{bmatrix} V^T, \tag{15}$$

Note that $\lambda_{max}=\max_i |\lambda_i|=1$, where $\lambda_i$ are eigenvalues of A, because the graph shift operator
is a transition matrix. In this case, $h_0=1, h_1=-1$ and $h_i=0$ for all i>1, $\Sigma_{l=0}^{N-1} h_l==0$. Thus, a
Haar-like high-pass graph filter is both shift and rotation invariant. The graph frequency response of a Haar-like high-pass graph filter is $h_{HH}(\lambda_i)=1-\lambda_i$. Since the eigenvalues are ordered descendingly, we have $1-\lambda_i \leq 1-\lambda_{i+1}$, meaning low frequency response relatively attenuates and high frequency response relatively amplifies.

In the graph vertex domain, the response of the ith point is $$(h_{HH}(A)X)_i = x_i - \sum_{j \in N_i} A_{i,j} x_j,$$

Because A is a transition matrix, $\Sigma_{j \in N_i} A_{i,j}=1$ and $h_{HH}(A)$ compares the difference
between a point and the convex combination of its neighbors. The geometry interpretation of the proposed local variation is the Euclidean distance between the original point and the convex combination of its neighbors, reflecting how much information we know about a point from its neighbors. When the local variation of a point is large, the Euclidean distance between this point and the convex combination of its neighbors is long and this point provides a large amount of innovation.

We can verify the proposed local variation on some simple examples.

Example 1 When a point cloud form a 3D line, two endpoints belong to the contour.

Example 2 When a point cloud form a 3D polygon/polyhedron, the vertices (corner points) and the edges (line segment connecting two adjacent vertices) belong to the contour.

Example 3 When a point cloud form a 3D circle/sphere, there is no contour.

When the points are uniformly spread along the defined shape, the proposed local variation (14) satisfies Examples 1, 2 and 3 from the geometric perspective. For example, in FIG. 3, sub-figure 305, Point 2 is the convex combination of Points 1 and 3, and the local variation of Point 2 is thus zero.

Figure 3B:
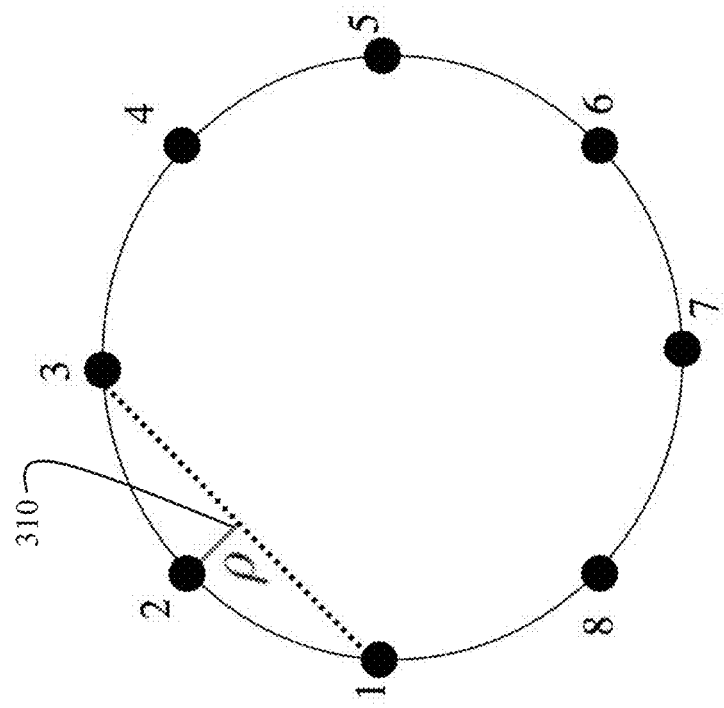
FIG. 3B is a schematic illustrating how the local variations can be captured by a graph operator, i.e. all the nodes are evenly spread on a circle and have the same amount of the innovation, which is represented as line extending from Point 4 to the dotted line, according to embodiments of the present disclosure.
Figure 3A:
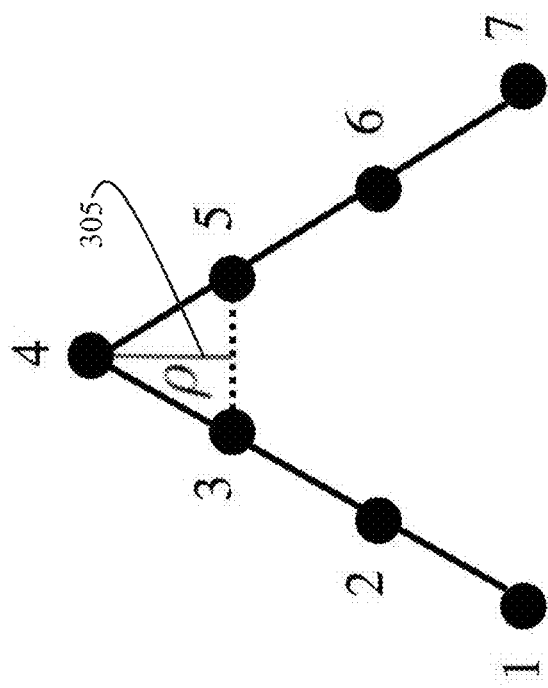
FIG. 3A is a graph illustrating how the local variations can be captured by a graph operator, i.e. showing Point 2 is the convex combination of Points 1 and 3, and the local variation of Point 2 is thus zero, according to embodiments of the present disclosure.

However, Point 4 is not the convex combination of Points 3 and 5 and the length of the red line indicates the local variation (innovation) of Point 4. It turns out that only Points 1, 4 and 7 have nonzero local variation, which is what we expect. In FIG. 3, sub-figure 310, all the nodes are evenly spread on a circle and have the same amount of the innovation, which is represented as a red line. Similar arguments show that the proposed local variation (14) satisfies Examples 1, 2 and 3.

The feature-extraction operator $f(X)=\|h_{HH}(A)X\|_2^2$ is shift and rotation-invariant.

Based on Theorem 3, the optimal sampling distribution is $$\pi_i^* \propto P(h_{HH}(A)X)_i P_2^2 = \left\| x_i - \sum_{j \in N_i} A_{i,j} x_j \right\|_2^2, \quad (16)$$

where $A=D^{-1}W$ is a transition matrix.

Note that the graph Laplacian matrix is commonly used to measure variations. Let $L=D-W \in R^{N \times N}$ be a graph Laplacian matrix. The graph Laplacian based total variation is $$Tr(X^T L X) = \sum_i \sum_{j \in N_i} W_{i,j} \|x_i - x_j\|_2^2. \quad (17)$$

where $N_i$ is the neighbors of the ith node and the variation contributed by the ith point is $$f_i(X) = \sum_{j \in N_i} W_{i,j} \|x_i - x_j\|_2^2. \quad (18)$$

The variation here is defined based on the accumulation of pairwise differences. We call (18) pairwise difference based local variation.

Figure 4:
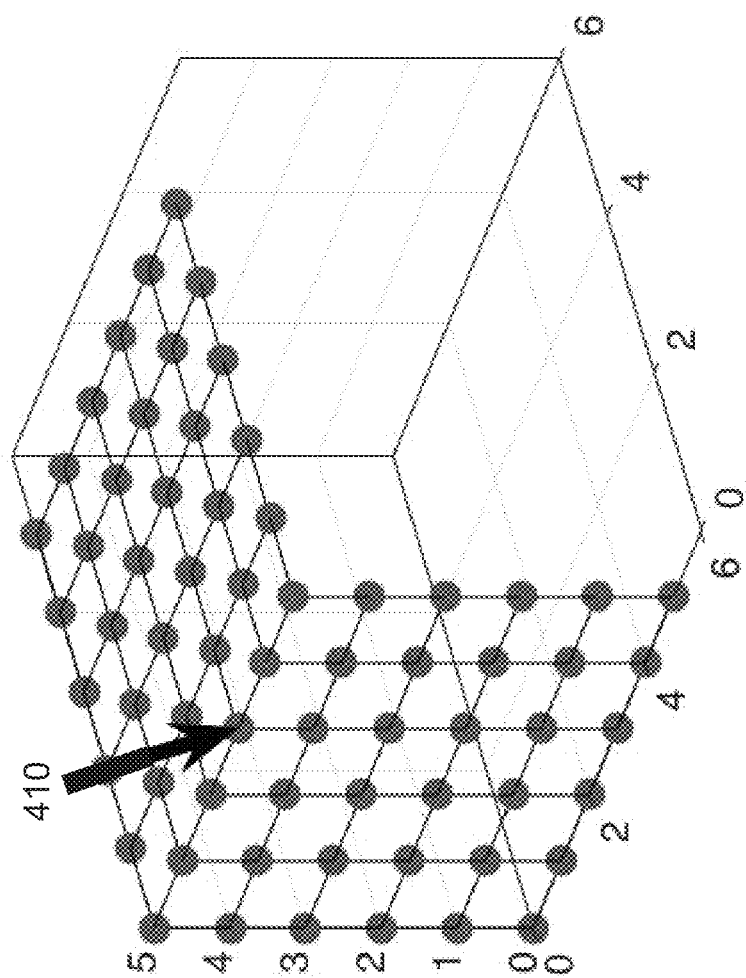
FIG. 4 is a schematic illustrating how a pairwise difference based local variation fails for an example with points on a cube, wherein only two faces are shown, according to embodiments of the present disclosure.

The pairwise difference based local variation cannot capture geometry change and violates Example 2. We show a counter example in FIG. 4. The points are uniformly spread along the faces of a cube and FIG. 4 shows two faces. Each point connects to its adjacent four points with the same edge weight. The pairwise difference based local variations of all the points are the same, which means that there is no contour in this point cloud. However, the annotated point (pointed by the black arrow) 410 should be a contour point.

Figure 5:
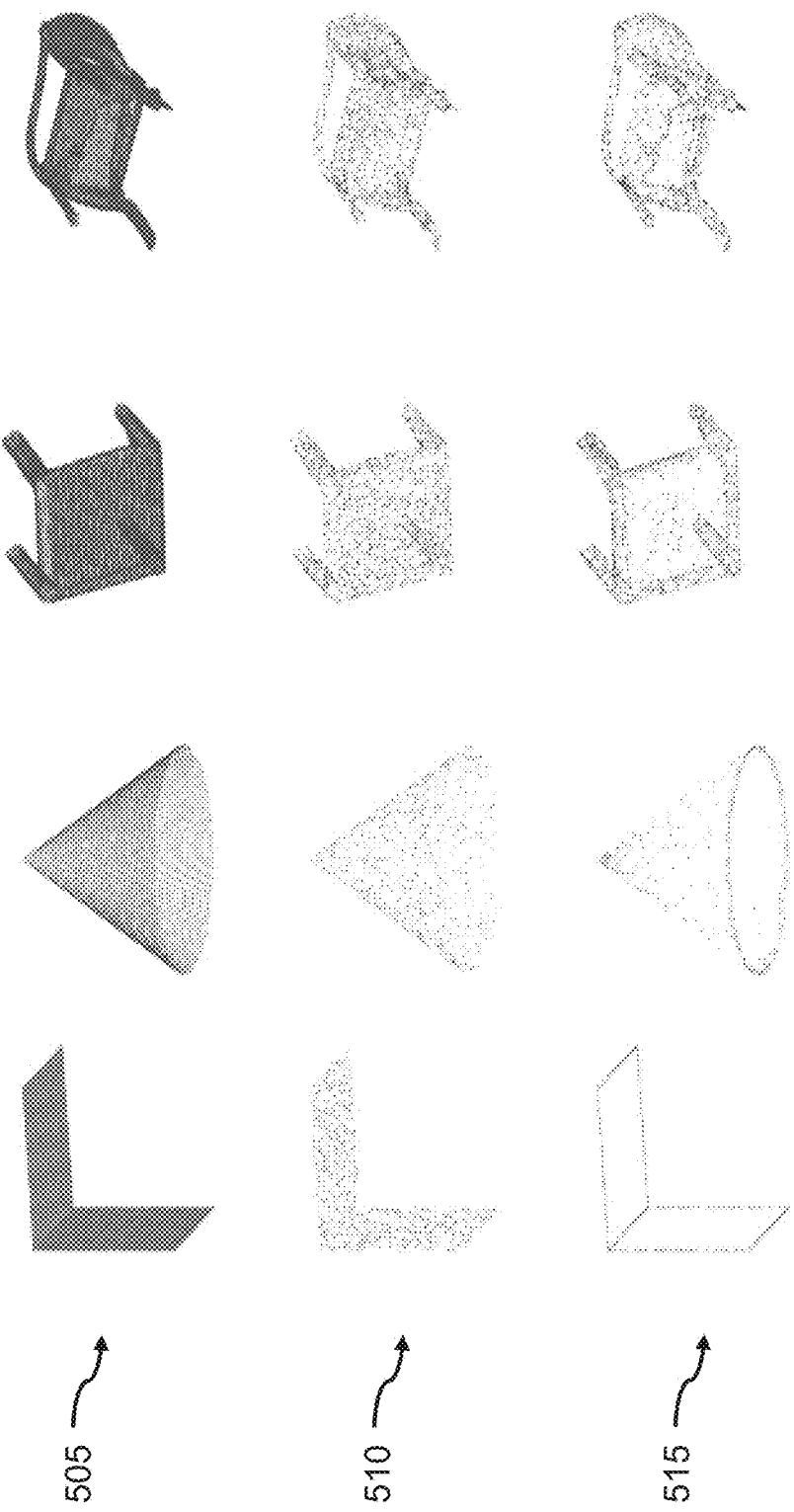
FIG. 5 is a schematic illustrating how the proposed local variation measurement outperforms pairwise difference based method, according to embodiments of the present disclosure.

FIG. 5 shows the local variation based sampling scores on some examples of the point cloud, including hinge, cone, table, chair, sofa and trash container. The first row shows (505) the original point clouds; the second (510) and third (515) rows show the resampled versions with respect to two local variations: pairwise difference based local variation (18) and Haar-like high-pass graph filtering based local variation (14). Two resampled versions have the same number of points, which is 10% of points in the original point cloud.

For two simulated objects, the hinge and the cone (first two rows), the pairwise difference based local variation (18) fails to detect contour and the Haar-like high-pass graph filtering based local variation (14) detects all the contours. For the real objects, the Haar-like high-pass graph filtering based resampling (14) also outperform the pairwise difference based local variation (18). In summary, the Haar-like high-pass graph filtering based local variation (14) shows the contours of objects by using only 10% of points.

Figure 6:
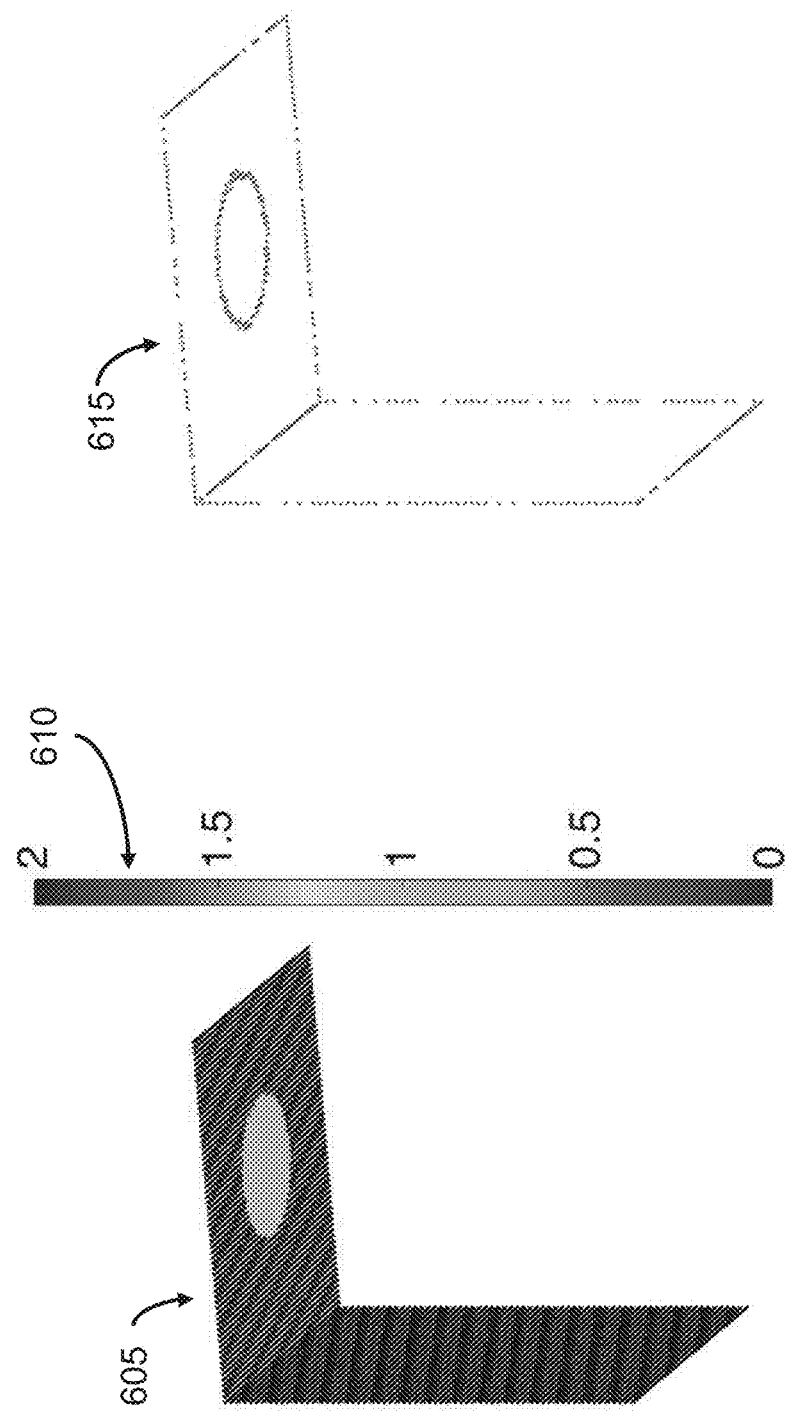
FIG. 6 is a schematic illustrating that the high-pass graph filtering based resampling detects both geometric contour and the texture edges, according to embodiments of the present disclosure.

The high-pass graph filtering based resampling strategy can be easily extended to detect transient changes in other attributes. In FIG. 6, sub-figure 605 simulates a hinge with two different textures. The points in black have a same texture with value 0 and the points indicated by a green circle have a different texture with value 1, see 610. We put the texture as a new attribute and the point cloud matrix $X \in R^{N \times 4}$, where the first three columns are 3D coordinates and the fourth column is the texture. We resample 10% of points based on the high-pass graph filtering based local variation (14). In FIG. 6, sub-figure 615 shows the resampled point cloud, which clearly detects both the geometric contour and the texture contour.

Low-Pass Graph Filtering

In classical signal processing, a low-pass filter is used to capture a main shape of a smooth signal and reduce noise. Similarly, we use a low-pass graph filter to capture a main shape of a point cloud and reduce sampling noise during obtaining 3D points. Since we use the 3D coordinates of points to construct a graph (4), the 3D coordinates are naturally smooth on this graph, meaning that two adjacent points in the graph have similar coordinates in the 3D space. When noises and outliers occur, a low-pass graph filter, as a denoising operator, uses local neighboring information to approximate a true position for each point. Since the output after low-pass graph filtering is a denoised version of the original point cloud, it may be more appealing to resample from denoised points than original points.

Ideal Low-Pass Graph Filter

A straightforward choice is an ideal low-pass graph filter, which completely eliminates all graph frequencies above a bandwidth while passing those below unchanged. An ideal low-pass graph filter with bandwidth b is $$h_{IL}(A) = V \begin{bmatrix} I_{b \times b} & 0_{b \times (N-b)} \\ 0_{(N-b) \times b} & 0_{(N-b) \times (N-b)} \end{bmatrix} V^T$$

$$= V_{(b)} V_{(b)}^T \in R^{N \times N},$$

where $V_{(b)}$ is the first b columns of V, and the graph frequency response is $$h_{IL}(\lambda_i) = \begin{cases} 1, & i \le b \\ 0, & \text{otherwise.} \end{cases} \quad (19)$$

Figure 7:
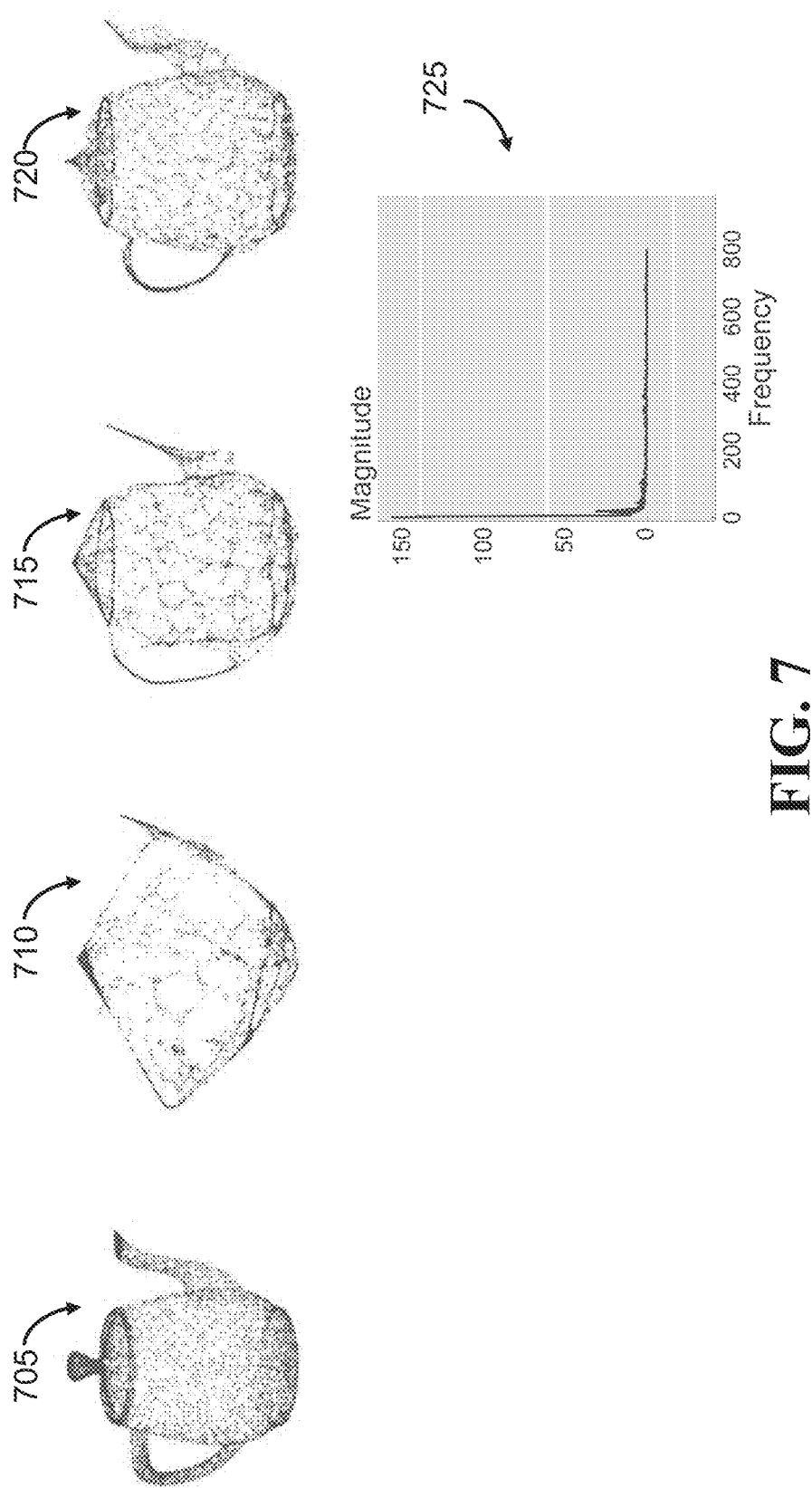
FIG. 7 is a schematic illustrating that low-pass approximation represents the main shape of a point cloud, according to embodiments of the present disclosure.

The ideal low-pass graph filter $h_{IL}$ projects an input graph signal into a bandlimited subspace and $h_{IL}(A)s$ is a bandlimited approximation to the original graph signal s. We show an example in FIG. 7, where sub-figure 705 is the original point cloud, a teapot, sub-figures 710, 715 and 720 shows that the bandlimited approximation to the 3D coordinates of a teapot gets better when the bandwidth b increases. We see that the bandlimited approximation changes the shape of the teapot rapidly: with 10 graph frequencies, we only obtain a rough structure of a teapot. The bandlimited approximation is thus more useful in editing than denoising. Sub-figure 725 shows that the main energy is concentrated in the low-pass graph frequency band.

The feature-extraction operator $f(X)=V_{(b)}V_{(b)}^T X$ is shift and rotation-variant. Based on Theorem 4, the corresponding optimal resampling strategy is $$\pi_i^* \propto \sqrt{c^2\|(V_{(b)})_i\|_2^2 + \|(V_{(b)}V_{(b)}^T X_o)_i\|_2^2} = \sqrt{c^2\|v_i\|_2^2 + \|X_0^T V_{(b)} v_i\|_2^2}, \quad (20)$$

where $v_i \in \mathbb{R}^b$ is the ith row of $V_{(b)}$.

A direct way to obtain $\|v_i\|_2$ requires the truncated eigen decomposition (7), whose computational cost is $O(Nb^2)$, where b is the bandwidth. It is potentially possible to approximate the leverage scores through a fast algorithm [?, ?], where we use randomized techniques to avoid the eigen decomposition and the computational cost is $O(Nb \log(N))$. Another way to leverage computation is to partition a graph into several subgraphs and obtain leverage scores in each subgraph.

Note that this resampling strategy is similar to sampling and recovery of approximately bandlimited graph signals, whose idea is to sample the signal coefficients at a few nodes and approximately recover the signal coefficients at all the other nodes. Here we model the attributes of the point cloud as graph signals, sample the attributes of a few points and approximately recover the attributes of all the other points.

We could see that the resampling strategy based on ideal low-pass graph filtering tends to put more samples on points whose neighboring points vary rapidly in the 3D space, because small-variation areas introduce lots of redundant information and we do not need to take many samples. The graph takes care of the space distribution of a point cloud and analyzes the amount of information of each point via the graph Fourier basis. We also see that with increasing number of graph frequencies, the sampling scores tend to be uniform. This means that when we want to preserve overall information, the importance score becomes equally everywhere.

Haar-Like Low-Pass Graph Filter

Another simple choice is Haar-like low-pass graph filter; that is, $$h_{HL}(A) = I + \frac{1}{|\lambda_{max}|}A \quad (21)$$

$$= V \begin{bmatrix} 1+\frac{\lambda_1}{|\lambda_{max}|} & 0 & \cdots & 0 \\ 0 & 1+\frac{\lambda_2}{|\lambda_{max}|} & \cdots & 0 \\ \vdots & \vdots & \ddots & \vdots \\ 0 & 0 & \cdots & 1+\frac{\lambda_N}{|\lambda_{max}|} \end{bmatrix} V^T,$$

where $\lambda_{max} = \max_i |\lambda_i|$ with $\lambda_i$ being eigenvalues of A. The normalization factor $\lambda_{max}$ is to avoid the amplification of the magnitude. We denote $A_{norm}=A/|\lambda_{max}|$ for simplicity.

The graph frequency response is $h_{HL}(\lambda_i)=1+\lambda_i/|\lambda_{max}|$. Since the eigenvalues are ordered descendingly, we have $1+\lambda_i \geq 1+\lambda_{i+1}$, meaning low frequency response relatively amplifies and high frequency response relatively attenuates.

In the graph vertex domain, the response of the ith point is $$(h_{HL}(A)X)_i = x_i - \sum_{j \in N_i} (A_{norm})_{i,j} x_j,$$

where $N_i$ is the neighbors of the ith point. We see that $h_{HL}(A)$ averages the attributes of each point and its neighbors to provide a smooth output.

The feature-extraction operator $f(X)=h_{HL}(A)X$ is shift and rotation-variant. Based on Theorem 4, the corresponding optimal resampling strategy is $$\pi^*_i \propto \sqrt{c^2\|(I+A_{norm})_i\|_2^2 + \|((I+A_{norm})X_o)_i\|_2^2},$$

To obtain this optimal sampling distribution, we need to compute the largest magnitude eigenvalue $\lambda_{max}$, which takes $O(N)$, and compute $\|(I+A_{norm})_i\|_2^2$ and $\|((I+A_{norm})X_o)_i\|_2^2$ for each row, which takes $O(\|vec(A)\|_0)$ with $\|vec(A)\|_0$ the nonzero elements in the graph shift operator. We can avoid to compute the largest magnitude by using a normalized adjacency matrix or a transition matrix as a graph shift operator. A normalized adjacency matrix is $D^{1/2}WD^{1/2}$, where D is the diagonal degree matrix, and a transition matrix is obtained by normalizing the sum of each row of an adjacency matrix to be one; that is $D^{-1}W$.
In both cases, the largest eigenvalue of a transition matrix is one, we thus have $A=A_{norm}$.

FIG. 8 shows the denoising performance by using resampling based on Haar-like low-pass graph filtering (??) on bunny. The point cloud of bunny includes 35,947 points. Each coordinate is contaminated by a Gaussian noise with mean zero and variance 0.002. In FIG. 8, sub-figure 805 shows the noisy bunny. We uniformly resample 10% of points from the noisy bunny, which is shown in sub-figure 810. We see that resampled version is also noisy. Based on the proposed Haar-like low-pass graph filtering, we obtain a denoised bunny in sub-figure 815 and we resample 10% of points according to the optimal sampling distribution (??) from the denoised bunny. The resampled version of the noisy bunny is shown in sub-figure 820. We see that by using the same number of points, the resampled version based on Haar-like low-pass graph filtering 820 is less noisy and more representative than the resampled version based uniform sampling 810.

To quantitatively evaluate the performance of resampling, we measure the Euclidean distance between each resampled point and the nearest point in the original noiseless point cloud; that is, $$\text{Error}(X_M) = \sum_{i=1}^{M} \min_{j=1,\ldots,N} \|(X_M)_i - (X)_j\|_2, \quad (22)$$

where $X \in \mathbb{R}^{N \times k}$ is the noiseless point cloud and $X_M \in \mathbb{R}^{M \times k}$ is a resampled point cloud. Since we resample from a noisy point cloud, the resampled points are shifted from the original points.
The error metric in (22) quantifies the total shifts. A smaller shift means better representation of the original point cloud. For example, the error of the resampled point cloud in sub-figure 810 is 6.1824 and the error of the resampled point cloud in sub-figure 820 is 3.7077. This validates the advantage of using low-pass graph filtering during resampling.

Another Embodiment

Above we proposed some basic graph filtering based resampling tools including all-pass,
low-pass and high-pass graph filter, in this section, we propose some variant designs that show how to adapt them to satisfy special requirements.
Point Density Consideration For the pure high-pass graph filter as proposed in Section 3.2, the importance score put for
a purely favors the local variance in the point cloud. For a point cloud which dynamically allocate point density, e.g. according to the level of interest, we like to jointly take the point density into consideration together with the local variance.

In one embodiment, considering that degree matrix D can be a representation of the
density distribution, we propose to modify the Haar-like high pass filter in Eqn. 15 in the following way, $$h_{HH}(A)=D(I-A)=D-W=L, \quad (23)$$

where the resulting high pass graph operator is actually a graph Laplacian operator L. Note that
the degree matrix D above could be replaced by another density representation and the resulted
operator is not necessary to be graph Laplacian.

With point density being considered, the sampling probability transition between edge area
and flat area would become smoother. This approach may be more favorable if the input point cloud was pre-processed to emphasized areas of interest.
Minimum Sampling Probability Guarantee For a high-pass graph filter as proposed in Section 3.2 or Section 3.4.1, the importance
score assigned to some points may be far less than those of other points. Typically, the points from smoothest area can have a nearly zero sampling probability, compared to points near to edges or corners. As a result, those points from flat area would have little chances to be selected during the resampling.

For some conventional surface modeling methods to build a surface from point cloud, it
may pose challenges to over-emphasize on the edge/corner area while leaving the surfaces inside to be almost empty. To overcome this, there is a motivation for a trade-off between maintaining the overall geometry information and contour information in the point cloud. In order to ensure a minimum sampling probability across all over the point cloud, we propose to enforce a minimum sampling probability.

Figure 13B:
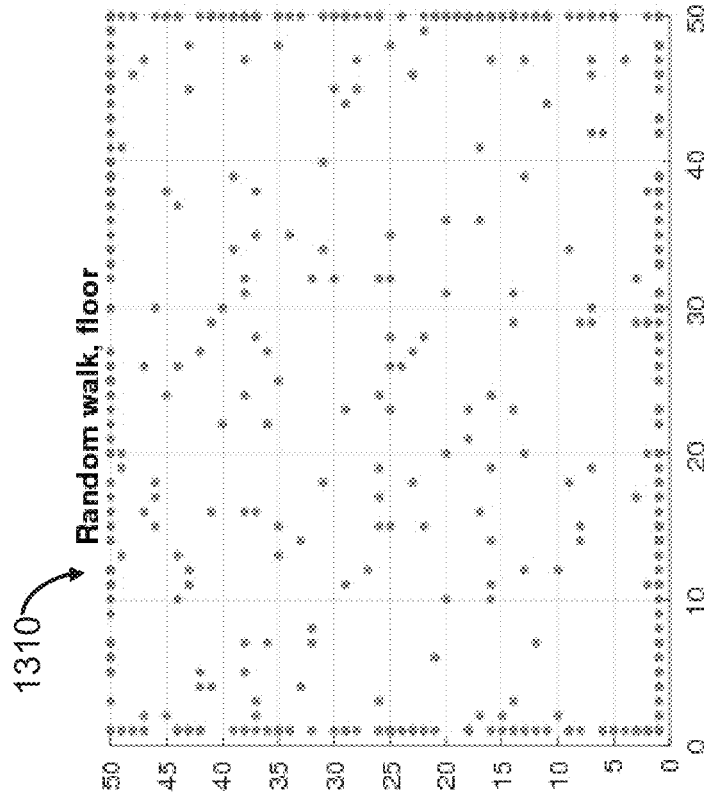
FIG. 13A and FIG. 13B are graphs comparing the sampling result with graph random walk without flooring (FIG. 13A) versus the graph random walk with flooring (FIG. 13B) on one face of a cubic object, according to embodiments of the present disclosure.
Figure 13A:
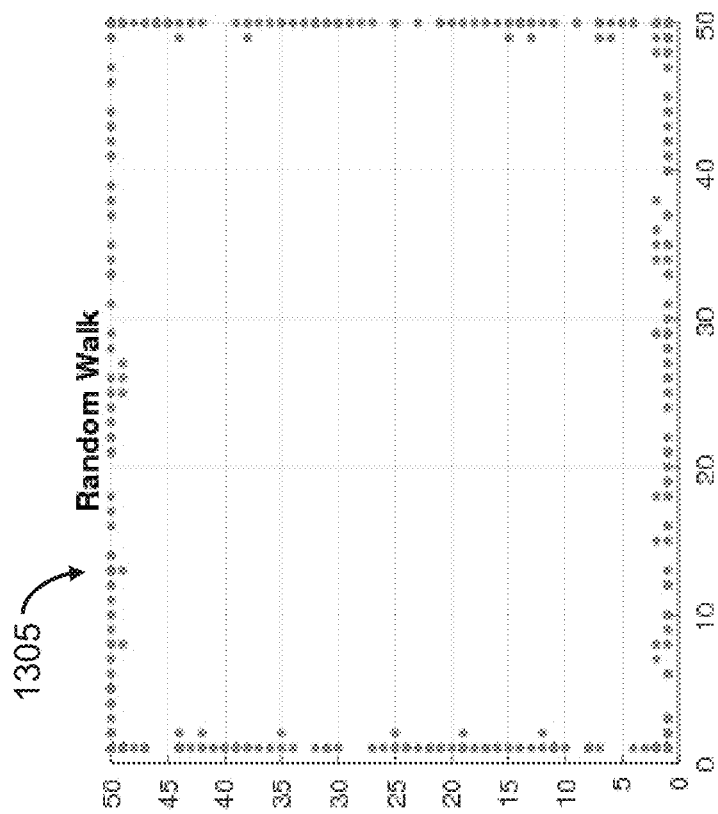

FIG. 13 compares the sampling result with graph random walk without flooring versus
with flooring on one face of a cubic object. Sub-figure 1305 is the sampling locations if a pure graph random walk is in use. Sub-figure 1310 is the corresponding result with a minimum probability being enforced. It can be seen how the sampled points are shifted to consider flat areas as well as the edge area by setting a minimum sampling probability.
Nearly Low Pass Graph Filtering Suppose we wish to apply a low pass filter to the graph spectrum on the point cloud in
order to remove high frequency components, the ideal low-pass graph filter proposed in Section 3.3 need to compute at least some eigenvalue and eigenvector pairs, which may cause undesired computation complexity. Here we propose k-polynomial or k-conjugate gradient filter [?] to be utilized in the proposed framework of this invention. Next we assume the basic graph operator is the symmetric normalized graph Laplacian operator L without sacrificing generality of using other graph operators.
k-POLY If restricting ourselves to polynomial filtering, e.g., due to computational considerations,
we can setup a problem of optimal polynomial low pass filters. An optimal polynomial low pass filter is based on Chebyshev polynomials.

Specifically, we propose to use a degree k Chebyshev polynomial $h_{k\text{-}CHEB}$ defined over
the interval [0,2] with a stop band extending from $l \in (0,2)$ to 2. Since we define the graph spectrum in terms of the eigenspace of the symmetric normalized Laplacian L, all the eigenvalues of L lie in the interval [0,2]. The construction of a Chebyshev polynomial is easily obtained by computing the roots of the degree k Chebyshev polynomial $\hat{r}(i)=\cos(\pi(2i-1)/2k)$ for i=1 ... k. over the interval [-1,1], then shifting the roots to the interval [l,2] via linear transformation to obtain the roots $r_i$ of the polynomial $h_{k\text{-}CHEB}$, and scaling the polynomial using $r_0$ such that $h_{K\text{-}CHEB}(0)=1$. This results in formula $$h_{k\text{-}CHEB}(L) = p_k(L) = \prod_{i=1}^{k}\left(1 - \frac{L}{r_i}\right) = r_0 \prod_{i=1}^{k}(r_i - L);$$

Chebyshev polynomials are minimax optimal, uniformly suppressing all spectral components on
the interval [l,2] and growing faster than any other polynomial outside of [l,2]. The stop band
frequency l remains a design parameter that needs to be set prior to filtering.
k-CG Furthermore, a k-CG low-pass filter [?] can be also used to mimic a low-pass filter in the
proposed framework of this invention.

Figures 14A, 14B:
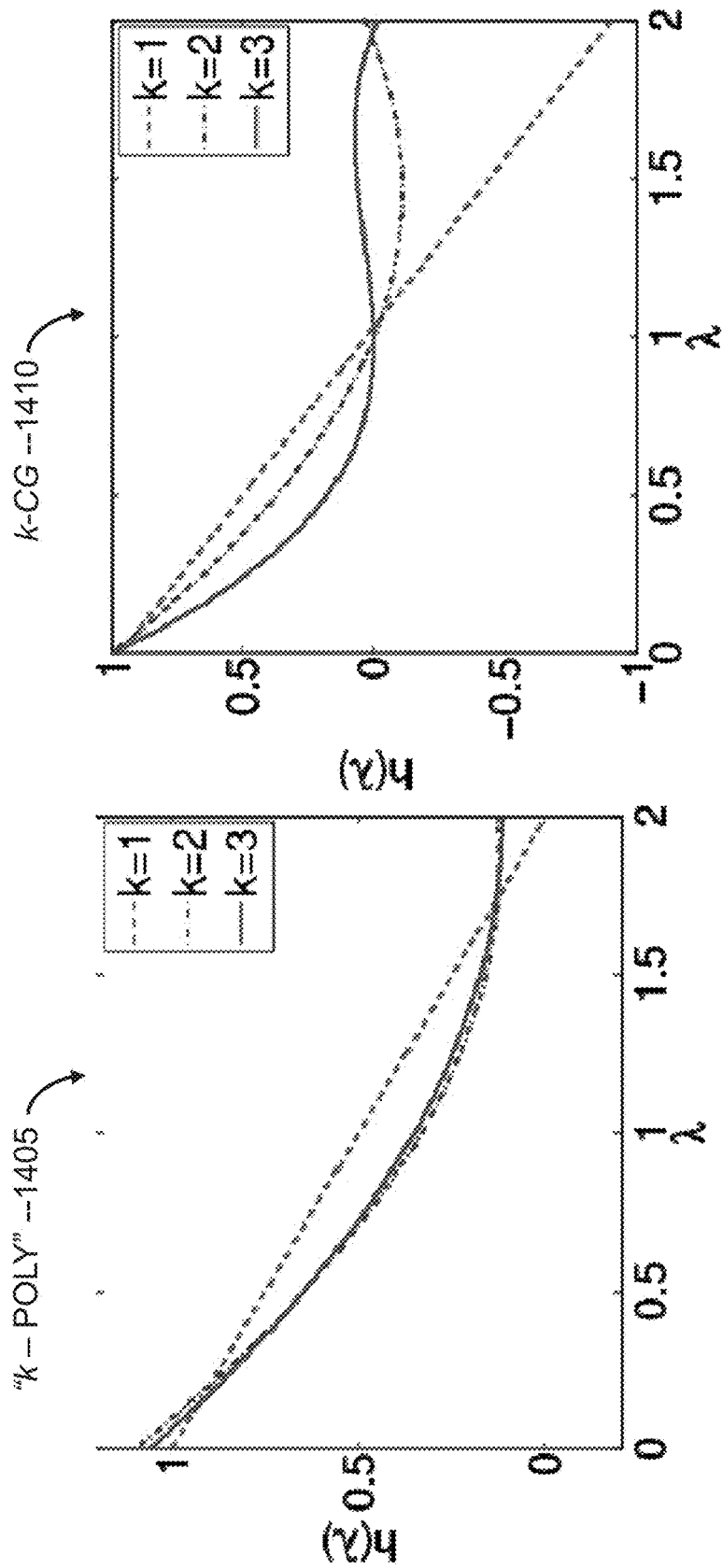
FIG. 14A and FIG. 14B are graphs comparing the spectral response of k-POLY (FIG. 14A) and k-CG (FIG. 14B) methods with different degrees that can be integrated with the proposed low-pass graph filter based resampling, according to embodiments of the present disclosure.

FIG. 14 shows the spectral response of k-POLY (sub-figure 1405) and k-CG (sub-figure 1410) methods with k=1,2,3.
Conditional Sampling With the approach proposed in Section 3, it is assumed that the importance score associated
with each point is independent from any other points, and hence the score is kept the same no matter which points have been selected during the sampling procedure. In this section, we consider the case that the importance score of a point is being actively updated during the sampling procedure, that is, the importance score of a point would be affected by those points that have been sampled. Intuitively, the importance score should become to zero for a point that has already been sampled, while the score of a point farthest to the sampled point should be kept unchanged.

Sampling distribution π is directly used as a measure of importance score in this section.

Here, we propose an active importance score $\pi_a^{i,r}$ of a point i relative to a reference
point r.

$$\pi_a^{i,r} = \frac{Px_i - x_r P_2}{Px_f - x_r P_2}, \quad (24)$$

where $x_f$ is the point farthest from the point $x_r$. And after a new sampling point is determined, the importance score will be updated as follows.

$$\pi \Leftarrow \pi \pi_a \quad (25)$$

Unfortunately, as the distances to all other points need to be counted, the calculation of
$\pi_a$ and hence the updating of pi involves a high computation complexity. One way to limit the involved complexity is to avoid updating the importance scores after every new sampling point is selected. Instead, the scores can be updated only after a first group of points are sampled and before a second group of points are to be sampled. This may lead to greater performance degradation as the updating is conducted at a rather coarse step. Next we propose two novel ways to elevate the complexity burdens.

Voxel Approximation

Instead of computing the exact importance score updating factor $\pi_a$ for every point, the
factor for points within a certain neighborhood could be shared, $$\pi_a^{i,r} = \frac{P\hat{x}_i - x_r P_2}{P\hat{x}_f - x_r P_2} \quad (26)$$

where $\hat{x}_i$ is the centroid point of a voxel that $x_i$ belongs to. A fast algorithm, e.g. octree
decomposition, can be used to partition points into voxels.

m-Hop Approximation

In another embodiment, we assume that there is no impact on points that are far away
enough from a newly sampled point. Given the radius $\pi$ was used to construct the graph over the point cloud, let $m\tau$ be the approximated radius within which the importance score need to be updated.

$$\pi_a^{i,r} = \frac{Px_i - x_r P_2}{\{Px_f - x_r P_2\}}, \text{ if } Px_i - x_r P_2 < m\tau \quad (27)$$

$$0, \text{ otherwise}$$

Unfortunately, it is not that straightforward to reduce the number of computation of
distances using the above formula, as all the distances need to be evaluated against a threshold. A naive method to alleviate the problem is again to use voxel centroid to approximate per-point distances. Apart from the naive method, in this subsection, we propose a novel method as shown in FIG. 15 that could be more efficiently implemented.

As in FIG. 15, the point cloud is represented by X with each row corresponding to a
point, each column corresponding to an attribute. A is a determined graph operator (for example, in matrix form), or a function of a basic graph operator. The set of points that have been sampled previously is denoted by $M_{in}$.

The objective is to find a new sampling set $M_{out}$ with n new sampling points, by
considering impacts of old sampling points on their neighborhood within a radius of $m\tau$.

In Step 1, initiate an operator Q the same as A.
In Step 2, we propose the replace the rows in Q with $1_i$ for sampled points $\forall i \in M_{in}$,
where entries of row vector $1_i$ are all 0, except that the i-th entry is equal to 1. The proposed changes in the graph operator means some corresponding modification in the (directed) graph structure, i.e. to remove the graph edges that are linked to the already sampled points, and to add self loop edges on the already sampled points.

In Step 3, the importance score $\xi_M$ and $\pi_M$ are initialized as $$PX-AXP_{row}, \text{ where}$$

$P.P_{row}$ is a row-wise norm operator. The initial importance score could be regarded as a measurement of local information based on the underlying graph structure.

In Step 4, the importance score $\xi_M$ is modified so that its entries corresponding to non-sampled
points are reset to 0. Now $\xi_M$ represents the local information that is being carried by the old sampling point set M.

In each iteration of Step 5, the local information is propagated from old sampling points to
their neighborhood in a radius of $\tau$. By looping m times in Step 5, such information is propagated within a range of $m\tau$ and it is represented by $\xi_M$.

In Step 6, after subtracting the information $\xi_M$ carried by the old sampling point set from
the total information $\pi_M$ from the original point cloud, now we have the new information measurement $\pi_M$.

Finally in Step 7, we could select a new sampling set $M_{out}$ with n new sampling points
based on the new information measurement $\pi_M$.

The algorithm proposed above can be called iteratively to granular grow the sampling set
to achieve a hierarchical representation of the original point cloud based on a very coarse representation. The resulted method is a "single pass" decomposition procedure as the subsequent processing of each layer could be invoked immediately after each layer is produced without waiting for the generation of another representation layer.

In another embodiment, we may not perform the norm operation in Step 3, but keep the
X-AX within $\xi_M$ to store the actual local information. Until in Step 6, before updating $\pi_M$, we perform the norm operation on $\xi_M$ first. It has advantages to propagate the local information rather than a local importance score, especially when the local information is in multi-dimensional.

Reference-Based Resampling

We consider resampling a set of reference points from a large-scale point cloud.
Reference points are used to represent the location of other points, which could be used in compression, indexing, and visualization of point cloud. The idea is to first encode the coordinates of the reference points, and then encode the relative coordinates to the closest reference points of all the other points. Let $M=(M_1, \cdot, M_K)$ denotes a sequence of K reference indices with $M_j \in \{1, \ldots, N\}$. The objective is to find a set of reference points by minimizing the following function.

$$\operatorname*{argmin}_{M} \sum_{m=1}^{N} w_m \left( \min_{M_j \in M} \|x_{M_j} - x_m\|_2^2 \right), \quad (28)$$

where $\min_{M_j \in M} \|x_{M_j} - x_m\|_2^2$ finds the closet reference point for each point and $w_m$ is the weight for the m-th point. For example, human eyes are more sensitive to the contour of objects when visualizing a 3D point cloud. We thus assign higher weights to contour points.

When the weights are uniform, (28) is similar with K-means clustering, except that the
cluster centers come from original points. We simply call (28) weighted K-means clustering problem. However, we cannot use ordinary clustering algorithms for a large-scale 3D point cloud. It is known that K-means clustering is computationally difficult (NP-hard). Even though there are efficient heuristic algorithms, such as Lloyds algorithm and its variants, theses algorithms take iterations to find the clusters and each iteration involves the computation of the distances between each of the K cluster centers and the N data points. When K is huge, the total computational cost is huge. Since we work with a large-scale point cloud and millions of reference points, we want to find reference points without iterating; in other words, the task is to efficiently choose seeding points for a weighted K-means clustering.

Inspired from K-means++[?], our idea is to sequentially update the sampling distribution.
Let $\pi^{(i)}$ denote the sampling distribution at the i-th time. Each time, we generate one sample from $\pi^{(i)}$ and update the sampling distribution according to this new sample. The sampling distribution is updated based on the Euclidean distance to the closest reference point. We avoid to sample many points in a local area. The difference between the proposed weighted K-means++ and original K-means++ is that we also consider the feature property. The algorithm sees FIG. 16.

In Step 1, initiate a set reference indices M=∅, and a sampling distribution $\pi$, where
the probability to sample the i-th sample is proportional to the feature value; that is, $\pi_i = w_i/\Sigma_j w_j$.

In Step 2, generate one reference index $M_1$ from the sampling distribution $\pi$ and put it
into the set M.

In Step 3, repeat Steps 3.1 and 3.2, until the cardinality of M reaches K.

In Step 3.1, update the sampling distribution $\pi$ by assigning $\pi_i = w_i D^2(x_i)/\Sigma_j w_j D^2(x_j)$, where $D(x_i) = \min_{M_j \in M} \|x_i - x_{M_j}\|_2$ is the Euclidean distance between the ith point and its closest reference point.

In Step 3.2, generate another reference index $M_2$ from the sampling distribution $\pi$ and
put it into the set M.

Similarly to the original K-means++, we can derive a theoretical bound for the error. We
can use similar techniques in Section 4.1 to elevate the complexity burdens.

Applications

In this section, we apply the proposed resampling strategies to a few applications: large-scale visualization, robust shape modeling, feature analysis, and hierarchical representation.

Large-Scale Visualization

Figure 9:
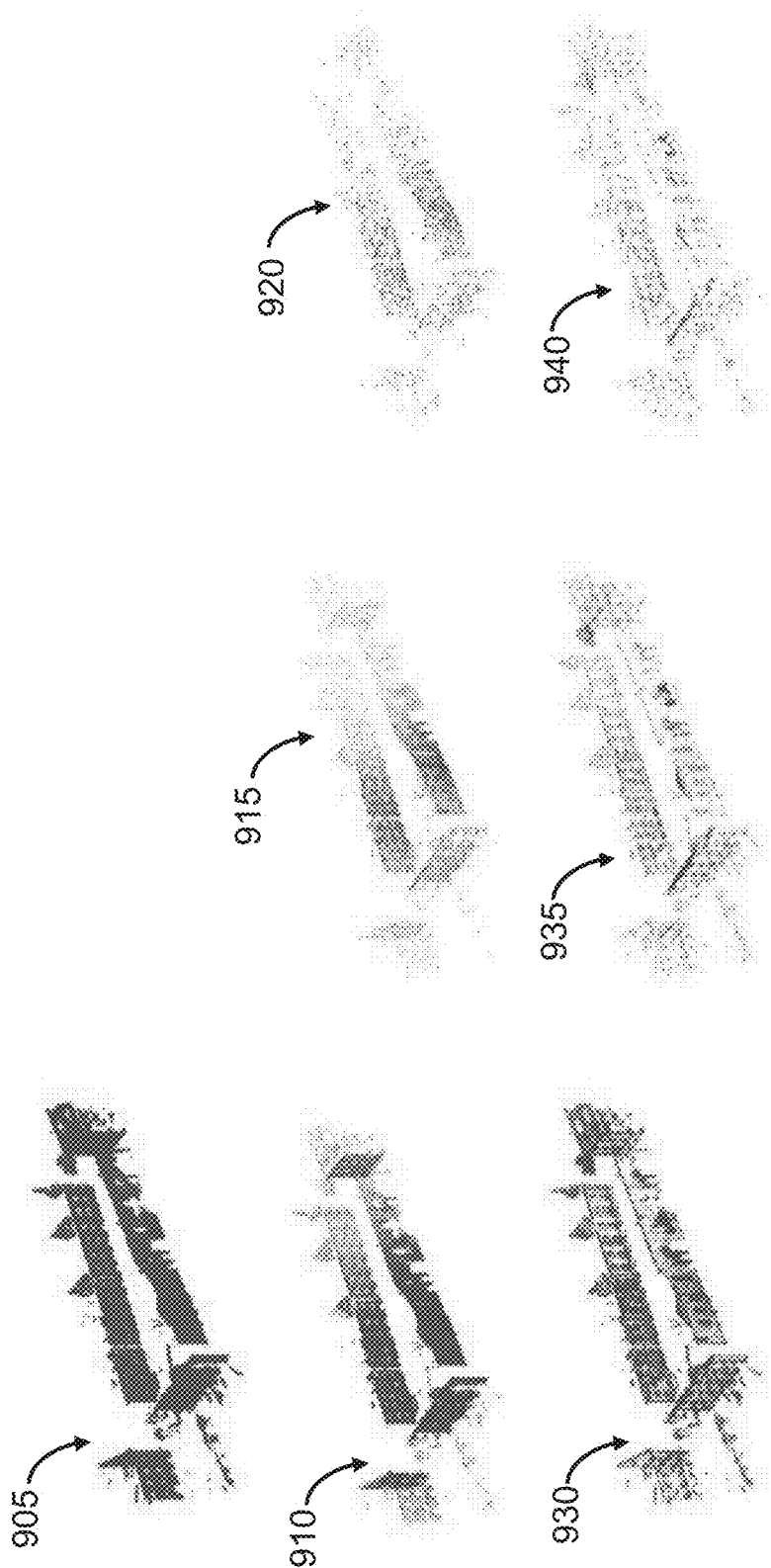
FIG. 9 is a schematic illustrating the visualization results of a proposed high pass graph filter based resampling strategy to efficiently visualize large-scale urban scenes, according to embodiments of the present disclosure.

In this task, we use the proposed resampling strategy to efficiently visualize large-scale
urban scenes. Since we are sensitive to the contours of buildings and streets in a urban scene, instead of showing an entire point cloud, we only show a selected subset of points. We consider a large-scale dataset, which involves several natural scenes with over 3 billion points in total and covers a range of diverse urban scenes: churches, streets, railroad tracks, squares, villages, soccer fields, castles. In FIG. 9, sub-figure 905 shows a point cloud of 'domfountain3', which contains 15,105,667 points (we ignore the points on ground). We compare the resampled point clouds based on two resampling strategies: uniform sampling and high-pass graph filtering based sampling. Sub-figures 910, 915, 920 show the resampled point clouds based on uniform sampling with 151,057, 15,105 and 1,510 (1%, 0.1% and 0.01%) points, respectively. Sub-figures 930, 935, 940 show the resampled point clouds based on high-pass graph filtering based sampling with 151,057, 15,105 and 1,510 (1%, 0.1% and 0.01%) points, respectively. We see that sub-figures 930, 935 and 940 show much clearer contours than sub-figures 910, 915, and 920. This validates that the high-pass graph filtering based resampling strategy provides visual-friendly results for large-scale urban scenes. The entire computation process, including graph construction, local variation computation and resampling, was running on Matlab in a desktop and takes less than 200 seconds.

Figure 10:
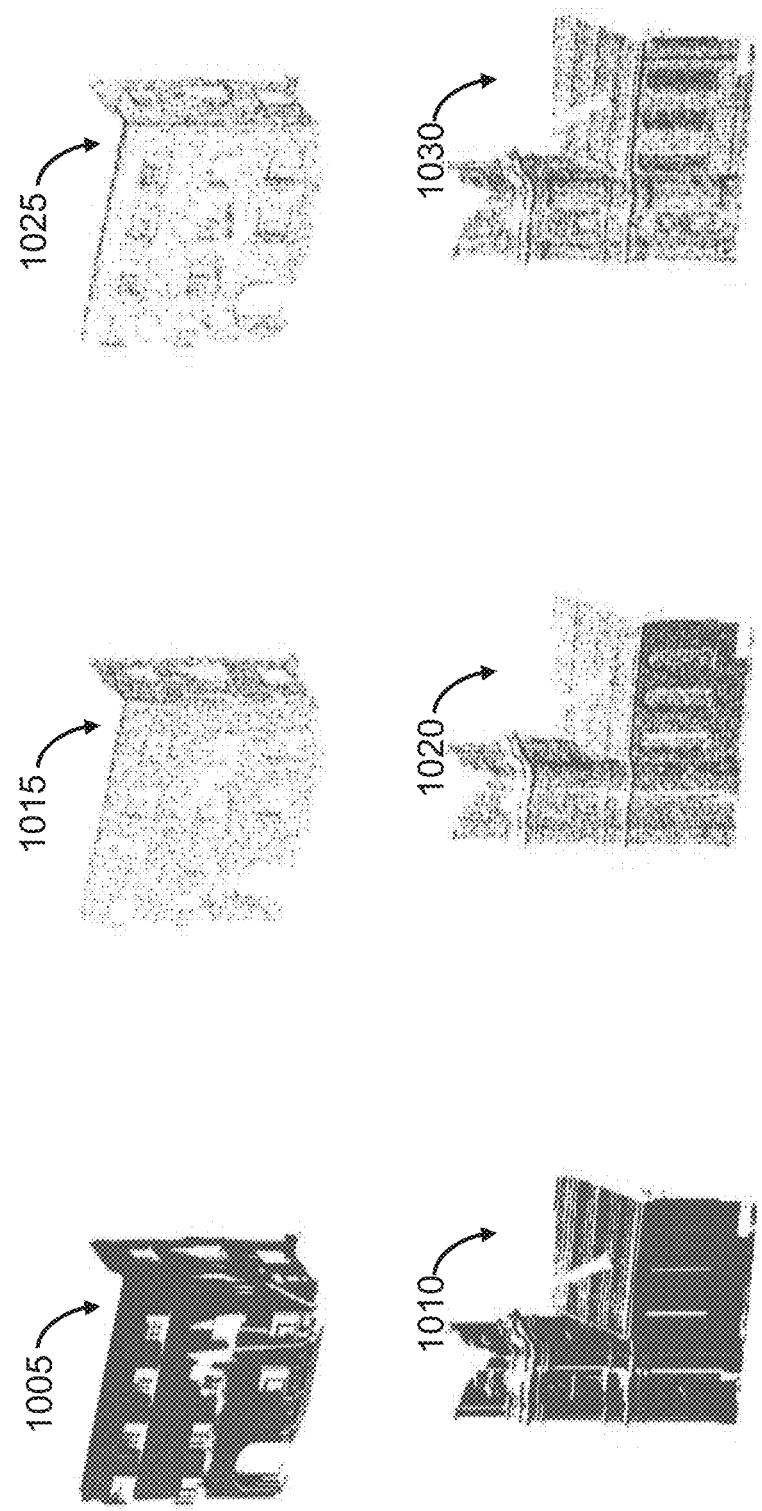
FIG. 10 is a schematic illustrating the details of visualization results of a proposed high pass graph filter based resampling strategy to efficiently visualize large-scale urban scenes, according to embodiments of the present disclosure.

To look into some details, we show two zoom-in examples in FIG. 10, including a
building and a church, which contain 381,903 and 1,622,239 points, respectively. Sub-figures 1005 and 1010 show the original point cloud. In sub-figures 1015 and 1020, uniform sampling is used. And in sub-figures 1025 and 1030, the proposed resampling based on high-pass graph filtering is used. It could be observed that we successfully detect the outlines of both the building and the church as the contour. Some details, such the gates and windows of the building and the clock and the roof of the church, are also highlighted. This validates the effectiveness of the proposed local variation. Comparing the third column to the second column, the resampled points based on high-pass graph filtering preserves contours. It is easier to recognize the contour of gates and windows of the building from the resampled points in 1025 and 1030 compared to 1015 and 1020.

Robust Shape Modeling

In this task, we use the proposed resampling strategy to achieve robust shape modeling.
The goal is to efficiently obtain a model by using a small subset of points, instead of using all the points in an original point cloud. We want this model reflects the true surface of an object, especially for a noisy point cloud.

In FIG. 11, Sub-figure 1105 shows a point cloud of a fitness ball, which contains 62,235
points. In this noiseless case, the surface of the fitness can be modeled by a sphere. Sub-figure 1110 fits a green sphere to the fitness ball. The radius and the 3D central point of this sphere is 0.318238 and [0.0832627 0.190267 1.1725]. To leverage the computation, we can resample a subset of points and fit another sphere to the resample points. We want these two spheres generated by the original point cloud and the resampled point cloud are similar.

In many real cases, the original points are collected with noise. To simulate the noisy case,
we add the Gaussian noise with mean zeros and variance 0.02 to each points. We first obtain a uniformly resampled point cloud. Then a denoised point cloud is obtained by the low-pass graph filtering (21) and the resampling strategy is based on (20). Finally we fit spheres from four point clouds, original ball (noisy free), noisy ball (with Gaussian noise added), uniformly resampled ball from the noisy ball, and resampled ball using a proposed low-pass graph filter. The statistics of the spheres are shown in FIG. 12. We see that the denoised ball and its resampled version outperform the noisy ball and the uniform-sampled version because the estimated radius and the central point is closer to the original radius and the central point. This validates that the proposed resampling strategy with low-pass graph filtering provides a robust shape modeling for noisy point clouds.

Feature Analysis

With the proposed high-pass graph filter based resampling, a small set of points with high
importance scores can be determined. Since such a small subset of points correspond to edges, corners in the point cloud, they can be regarded as key points of the original point cloud.

Moreover, feature descriptors can be defined on the selected key points of the original point
cloud, which is a collection of local descriptors upon some attributes associated on the points within a local neighborhood, e.g., location, gradients, orientations and scales.

Based on the derived feature descriptors, some point cloud analysis tasks can be conducted.
For example, given a query point cloud for a point cloud database, similar point cloud can be searched and retrieved. Similarity between two point cloud can be measured by computing the differences between their feature descriptors.

Hierarchical Representation

Due to limited processing capabilities, the population of points often need to be controlled.
For example, a point cloud rendering device may only be able to display up to a certain number of points at a time. Or a device to extract features from a point cloud may only be able to handle a limit-sized point set because of the limited computing resources available. A certain density of points corresponds to a scale level of a point cloud. Furthermore, operations like zoom-in/zoom-out need a series of scale levels of a point cloud, which result in a requirement to produce a hierarchical representation of a point cloud.

Assuming a higher layer of the representation is filled up with more points, let $S_i$ be the
set of points in the i-th layer, and i=1 be the coarsest layer, i=M be the finest layer.

A naive method to generate such a hierarchical representation is to produce a series of point
subsets at different scales from the raw point cloud independently and use a preferred resampling strategy as proposed earlier. With such a naive method, it is unnecessary for a point in a coarser layer to be present in a finer layer.

However, it may provide advantages if assuming that $\forall i \in S_1$, $i \in S_k$ would hold as long
as k<l. In this way, the information from a coarser layer won't be discarded when switching to a finer layer. The new information from a finer layer would be additive to a coarser layer to produce a refined output. In other words, it is a waste of storage space or transmission rate if dropping the information from the coarser layer when moving to a finer layer.

Below we propose an advanced approach to generate a hierarchical representation of a
point cloud in an iterative way.

Let the finest layer $S_N$ be equal to the raw point cloud. Suppose we need to generate a
coarser layer $S_j$ given the finer layer $s_{j+1}$ is available.

It is recommended to apply the above proposed resampling strategies on point set $S_{j+1}$.
That is, a independent nearest neighborhood graph would be constructed on the point set $S_{i+1}$, where nearest neighborhood need to be defined with a proper radius by considering the density of point in the current layer j+1. The radius should increase from a finer layer to a coarse layer. Then a preferred random sampling method is then applied to generate a subset $S_j$ from $S_{i+1}$. With the proposed procedure, a hierarchical representation is being generated from the most dense point set (finest resolution) to the most sparse point set (coarsest resolution).

When viewing the original point cloud, the viewer can perform zoom-in, zoom-out
operation by navigating between different layers of such a hierarchical representation.

In addition, a spatial scalable coding scheme can be designed following the hierarchical
representation generation. A preferred spatial scalable encoding scheme is a two-pass procedure, where the first pass is to generate the hierarchical representation from $S_N$ to $S_1$ and the second pass is for actual coding from $S_1$ to $S_N$. That is, the encoding starts from the coarsest layer $S_1$. Given that $S_i$ has been coded, we propose to encode the extra points $S_{i+1} \backslash S_i$ in a predictive way based on $S_i$.

In one implementation, we use an existing method, e.g. Octree coding method, to encode
the coarsest layer $S_1$. Next, in order to encode a finer layer $S_i$ using the points in $S_{i-1}$ as point predictors, we propose to cluster the points in $S_i$ using the points in $S_{i-1}$ as centroids based on Euclidean distances. In such a way, the new points in $S_i \backslash S_{i-1}$, could be efficiently predicted by the points in $S_{i-1}$.

Figure 17:
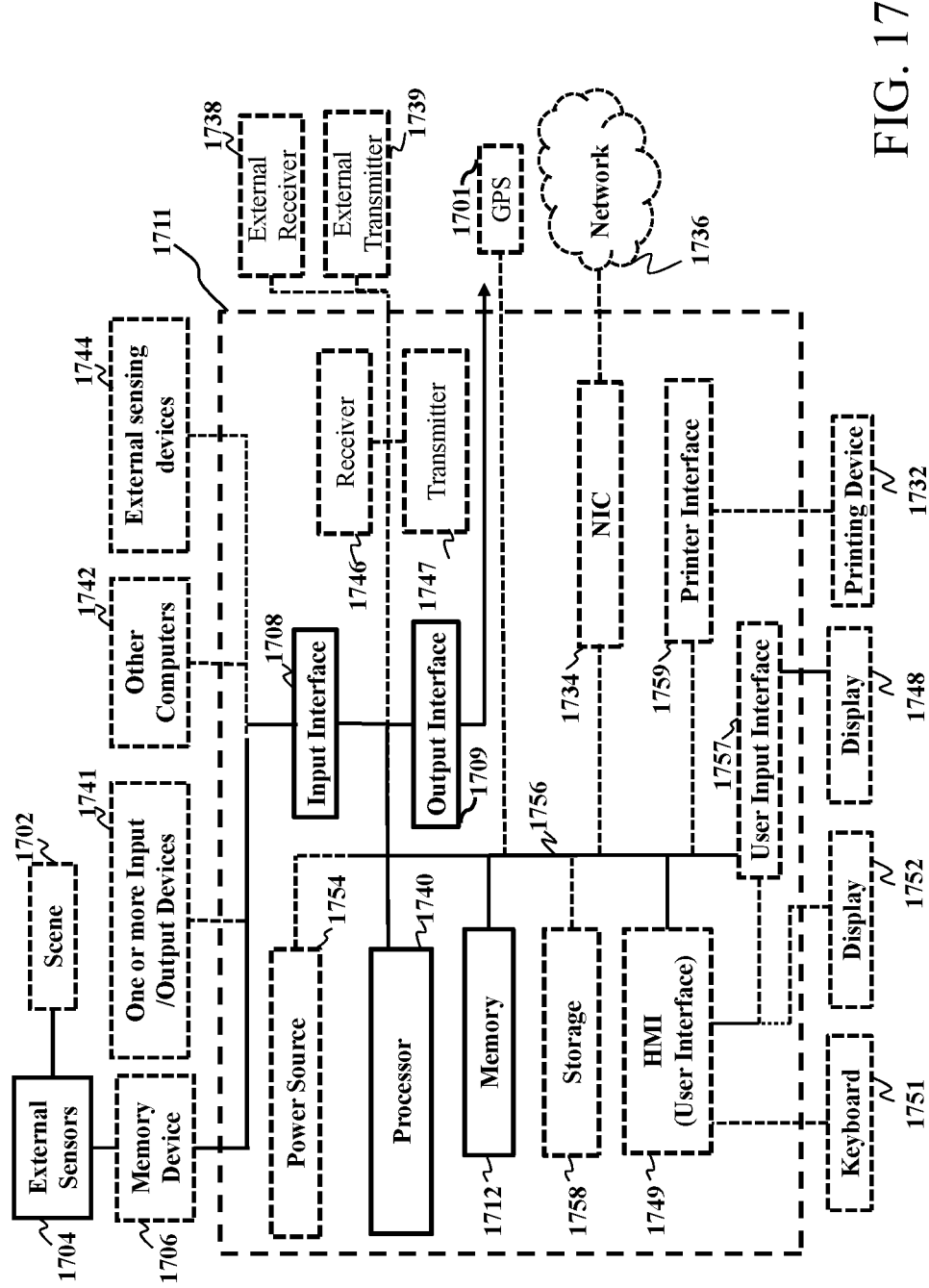
FIG. 17 is a block diagram of illustrating the method of FIG. 1, that can be implemented using an alternate computer or processor, according to embodiments of the present disclosure.

In present disclosure, we proposed a resampling framework to select a subset of points to
extract key features and leverage the subsequent computation in a large-scale point cloud. We formulated an optimization problem to obtain the optimal sampling distribution, which is also guaranteed to be shift and rotation invariant. We then specified the feature extraction operator to be a graph filter and studied the resampling strategies based on all-pass, low-pass and high-pass graph filtering. Several applications, including large-scale visualization, robust shape modeling, feature descriptor extraction, hierarchical representation and coding, are presented to validate the effectiveness and efficiency of the proposed resampling methods FIG. 17 is a block diagram of illustrating the method of FIG. 1, that can be implemented using an alternate computer or processor, according to embodiments of the present disclosure. The computer 1711 includes a processor 1740, computer readable memory 1712, storage 1758 and user interface 1749 with display 1752 and keyboard 1751, which are connected through bus 1756. For example, the user interface 1749 in communication with the processor 1740 and the computer readable memory 1712, acquires and stores the input point cloud data in the computer readable memory 1712 upon receiving an input from a surface, keyboard surface 1764, of the user interface 1764 by a user.

The computer 1711 can include a power source 1754, depending upon the application the power source 1254 may be optionally located outside of the computer 1711. Linked through bus 1756 can be a user input interface 1757 adapted to connect to a display device 1748, wherein the display device 1748 can include a computer monitor, camera, television, projector, or mobile device, among others. A printer interface 1759 can also be connected through bus 1756 and adapted to connect to a printing device 1732, wherein the printing device 1732 can include a liquid inkjet printer, solid ink printer, large-scale commercial printer, thermal printer, UV printer, or dye-sublimation printer, among others. A network interface controller (NIC) 1734 is adapted to connect through the bus 1756 to a network 1736, wherein time series data or other data, among other things, can be rendered on a third party display device, third party imaging device, and/or third party printing device outside of the computer 1711.

Still referring to FIG. 17, the input point cloud data, output point data or other data, among other things, can be transmitted over a communication channel of the network 1736, and/or stored within the storage system 1758 for storage and/or further processing. Further, the input point cloud data, output point data or other data may be received wirelessly or hard wired from a receiver 1746 (or external receiver 1738) or transmitted via a transmitter 1747 (or external transmitter 1739) wirelessly or hard wired, the receiver 1746 and transmitter 1747 are both connected through the bus 1756. The computer 1711 may be connected via an input interface 1708 to memory device 1706, to external sensors 1704 and the scene 1702. The computer 1711 may be connected via an input interface 1708 to external sensing devices 1744 and external input/output devices 1741. For example, the external sensing devices 1744 may include sensors gathering data before-during-after of the collected time-series data of the machine. For instance, environmental conditions approximate the machine or not approximate the machine, i.e. temperature at or near machine, temperature in building of location of machine, temperature of outdoors exterior to the building of the machine, video of machine itself, video of areas approximate machine, video of areas not approximate the machine, other data related to aspects of the machine. The computer 1711 may be connected to other external computers 1742. An output interface 1709 may be used to output the processed data from the processor 1740.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A system for processing input point cloud having points, wherein each point includes a set of attributes including two dimensional (2D) and three dimensional (3D) coordinates and other attributes, comprising:
    sensors sensing a scene, and in communication with a computer readable memory to produce the input point cloud;
    an output interface;
    a processor in communication with the computer readable memory, is configured to:
        access the input point cloud;
        construct a graph representing the input point cloud, based on each point in the input point cloud representing a node in the graph, and identify and connecting two neighboring nodes in the graph to obtain a graph edge;
        determine a graph filtering function based on the constructed graph;
        filter each point in the input point cloud by selecting a subset of attributes for the points and applying by the graph filtering function on the selected subset of attributes, to determine at least one value for each point in the input point cloud;
        produce a probability for each point, based on the at least one value of the point compared to a total of all values of the points in the input point cloud, and a predetermined number of points in an output point cloud;
        sample the input point cloud using random evaluation of the probabilities of each point, to obtain a subset of points in the input point cloud, wherein the subset of points is the output point cloud, such that the determination of the subset of points in the input point cloud includes determining a second subset of points, where additional points are selected and added to the determined subset of points, wherein the second subset of points provides a greater detail of the input point cloud than a detail of the determined subset of points of the input point cloud;
        update the probability factor of remaining points with a scale that is proportional to their Euclidean distances to the points in the determined subset of points; and
        store the output point cloud in the computer readable memory or output the output point cloud via the output interface in communication with the processor, wherein the output point cloud is used to assist in subsequent processing and assists in management of the input cloud data.

2. The system of claim 1, wherein the subset of attributes for the points are selected based on a user input.

3. The system of claim 1, wherein the producing of the probability for each point for sampling the input point cloud is based on the at least one value of the point compared to a total of all values of the points in the input point cloud, multiplied by the predetermined number of points in the output point cloud.

4. The system of claim 1, wherein the predetermined number of points in the output point cloud is determined by a user input on a surface of a user input interface in communication with the processor, to set a user number of points as the predetermined number of points in the output point cloud.

5. The system of claim 1, wherein the points in the input point cloud are organized or unorganized.

6. The system of claim 1, wherein the other attributes in the set of attributes for each point are from the group consisting of one or a combination of a color, a temperature, a transparency or a reflectivity.

7. The system of claim 1, wherein the graph edges are connected from a graph node to all neighboring graph nodes that are within a radius of z.

8. The system of claim 1, wherein the graph edges are connected from a graph node to its K nearest neighboring graph nodes.

9. The system of claim 1, wherein the selected subset of attributes includes 3D coordinates of each point, such that the 3D coordinates is used when determining the output point cloud.

10. The system of claim 1, wherein the selected subset of attributes includes color associated with each point, such that the color is used when determining the output point cloud.

11. The system of claim 1, wherein the probabilities of each point is any predefined positive constant for every graph node.

12. The system of claim 1, wherein the probabilities of each point is calculated from the graph filtering function that is represented by a function of one of a graph random walk (transition) matrix, a graph Laplacian matrix or a graph adjacency matrix.

13. The system of claim 1, further comprising:
outputting the output point cloud for the group consisting of one of visualization, object modeling, hierarchical representation or rendering.

14. The system of claim 1, further comprising:
generating feature descriptors for each point in the output point cloud that summarize the input point cloud; and
detecting objects based on the feature descriptors.

15. The system of claim 1, further comprising:
determining a second graph filtering function based on a graph structure modified from the original graph filtering function that has the graph edges to be removed which are linked to the points within the first point subset, and have self-loop graph edges to be added on them;
selecting an information descriptor with elements being equal to the feature descriptor on the points within the first point subset, and other elements being equal to zero;
calculating an updated information descriptor by applying the determined second graph operator on the selected information descriptor with certain times; and
updating the importance score using the updated information descriptor.

16. The system of claim 1, wherein the determination of subset of points in the input point cloud includes:
determining a second subset of points, where additional points are selected and removed from the determined subset of points, such that the second subset of points provides a lesser detail of the input point cloud than a detail of the determined subset of points of the input point cloud; and
coding the input point cloud from the coaster level to the finer level in a scalable way based on the hierarchical set of points.

17. A method for processing input point cloud having points, wherein each point includes a set of attributes including two dimensional (2D) and three dimensional (3D) coordinates and other attributes, comprising:
sensing a scene via sensors, the sensors are in communication with a computer readable memory to produce the input point cloud;
using a processor in communication with the computer readable memory, the processor is configured for:
accessing the input point cloud;
constructing a graph representing the input point cloud, based on each point in the input point cloud representing a node in the graph, and identify and connecting two neighboring nodes in the graph to obtain a graph edge;
determining a graph filtering function based on the constructed graph;
filtering each point in the input point cloud by selecting a subset of attributes for the points and applying by the graph filtering function on the selected subset of attributes, to determine at least one value for each point in the input point cloud,
producing a probability for each point, based on the at least one value of the point compared to a total of all values of the points in the input point cloud, and a predetermined number of points in an output point cloud;
sampling the input point cloud using random evaluation of the probabilities of each point, to obtain a subset of points in the input point cloud, wherein the subset of points is the output point cloud, such that the determination of the subset of points in the input point cloud includes determining a second subset of points, where additional points are selected and added to the determined subset of points, wherein the second subset of points provides a greater detail of the input point cloud than a detail of the determined subset of points of the input point cloud;
updating the probability factor of remaining points with a scale that is proportional to their Euclidean distances to the points in the determined subset of points; and
storing the output point cloud in the computer readable memory or outputting the output point cloud via the output interface in communication with the processor, wherein the output point cloud is used to assist in subsequent processing and assists in management of the input cloud data.

18. A non-transitory computer readable storage medium embodied thereon a program executable by a computer for performing a method, the method for processing stored input point cloud having points, wherein each point includes a set of attributes including two dimensional (2D) and three dimensional (3D) coordinates and other attributes, the method comprising:
sensing a scene via sensors, the sensors are in communication with the non-transitory computer readable storage medium to produce the input point cloud;
constructing a graph representing the input point cloud, based on each point in the input point cloud representing a node in the graph, and identify and connecting two neighboring nodes in the graph to obtain a graph edge;
determining a graph filtering function based on the constructed graph;
filtering each point in the input point cloud by selecting a subset of attributes for the points and applying by the graph filtering function on the selected subset of attributes, to determine at least one value for each point in the input point cloud,
producing a probability for each point, based on the at least one value of the point compared to a total of all values of the points in the input point cloud, and a predetermined number of points in an output point cloud;
sampling the input point cloud using random evaluation of the probabilities of each point, to obtain a subset of points in the input point cloud, wherein the subset of points is the output point cloud, such that the determination of the subset of points in the input point cloud includes determining a second subset of points, where additional points are selected and added to the determined subset of points, wherein the second subset of points provides a greater detail of the input point cloud than a detail of the determined subset of points of the input point cloud;

updating the probability factor of remaining points with a scale that is proportional to their Euclidean distances to the points in the determined subset of points; and storing the output point cloud in the non-transitory computer readable storage medium or outputting the output point cloud via an output interface in communication with the computer, wherein the output point cloud is used to assist in subsequent processing and assists in management of the input cloud data.

* * * * *